US010001912B2

(12) United States Patent
Miyakoshi et al.

(10) Patent No.: US 10,001,912 B2
(45) Date of Patent: Jun. 19, 2018

(54) ROBOT OPERATION APPARATUS, ROBOT SYSTEM, AND ROBOT OPERATION PROGRAM

(71) Applicant: DENSO WAVE INCORPORATED, Chita-gun, Aichi-pref. (JP)

(72) Inventors: Yoshihiro Miyakoshi, Chita (JP); Satoshi Ide, Chita (JP); Daisuke Kawase, Konan (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 168 days.

(21) Appl. No.: 14/872,403

(22) Filed: Oct. 1, 2015

(65) Prior Publication Data

US 2016/0096275 A1    Apr. 7, 2016

(30) Foreign Application Priority Data

Oct. 1, 2014  (JP) .................................. 2014-203054

(51) Int. Cl.
*B25J 13/06* (2006.01)
*G06F 3/0484* (2013.01)
(Continued)

(52) U.S. Cl.
CPC ........ *G06F 3/04847* (2013.01); *B25J 9/1656* (2013.01); *B25J 13/06* (2013.01); *G05B 19/409* (2013.01); *G06F 3/0412* (2013.01); *G06F 3/0486* (2013.01); *G06F 3/04883* (2013.01); *G05B 2219/36159* (2013.01);
(Continued)

(58) Field of Classification Search
CPC .. G06F 3/04847; G06F 3/0412; G06F 3/0486; G06F 3/04883; B25J 9/1656; B25J 13/06; G05B 19/409
See application file for complete search history.

(56) References Cited

U.S. PATENT DOCUMENTS

2009/0289591 A1* 11/2009 Kassow ............... B25J 19/0004
318/568.13
2014/0236565 A1*  8/2014 Kuwahara ............. B25J 9/1671
703/22

(Continued)

FOREIGN PATENT DOCUMENTS

JP        H11-262883 A    9/1999
JP        2006-142480 A   6/2006

*Primary Examiner* — Patrick H Mackey
(74) *Attorney, Agent, or Firm* — Oliff PLC

(57) ABSTRACT

In a robot operation apparatus, a motion command generator selects one of combinations of driving axes as an operation object from among preset combinations of the driving axes including at least one of: a driving axis associated with drag operation in a first direction for a touch panel; or a driving axis associated with drag operation in a second direction intersecting with the first direction. If touch operation detected by a touch operation detector is the drag operation, the motion command generator determines whether drag operation is in the first direction or the second direction. The motion command generator generates a motion command to drive the driving axis associated with drag operation in the first direction, if drag operation is in the first direction, and generates a motion command to drive the driving axis associated with drag operation in the second direction, if drag operation is in the second direction.

8 Claims, 19 Drawing Sheets

(51) Int. Cl.
  *G06F 3/041* (2006.01)
  *G06F 3/0488* (2013.01)
  *G06F 3/0486* (2013.01)
  *B25J 9/16* (2006.01)
  *G05B 19/409* (2006.01)

(52) U.S. Cl.
  CPC .......... *G05B 2219/36162* (2013.01); *G05B 2219/36168* (2013.01); *G06F 2203/04806* (2013.01); *G06F 2203/04808* (2013.01)

(56) References Cited

U.S. PATENT DOCUMENTS

| | | | |
|---|---|---|---|
| 2015/0045951 A1 | 2/2015 | Som | |
| 2015/0045955 A1* | 2/2015 | Hashiguchi | B25J 9/161 700/264 |
| 2015/0151431 A1* | 6/2015 | Suyama | B25J 9/1671 700/264 |
| 2015/0190925 A1* | 7/2015 | Hoffman | B25J 9/161 700/257 |
| 2015/0273689 A1* | 10/2015 | Ouchi | B25J 9/161 700/257 |
| 2016/0030134 A1* | 2/2016 | Shapter | G06F 3/0488 606/130 |
| 2016/0274784 A1* | 9/2016 | Yui | B25J 9/1658 |
| 2016/0274787 A1* | 9/2016 | Sugano | G06F 3/04883 |

* cited by examiner

FIG.11
| FOUR-AXIS ROBOT | OPERATION DIRECTION | |
| --- | --- | --- |
| | LATERAL DIRECTION (FIRST DIRECTION) | LONGITUDINAL DIRECTION (SECOND DIRECTION) |
| (1) COMBINATION A (FIRST BUTTON) | FIRST AXIS 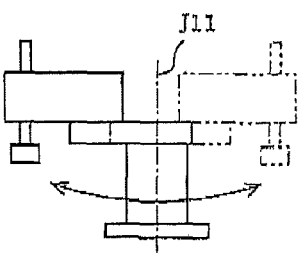 | |
| (2) COMBINATION B (SECOND BUTTON) | SECOND AXIS 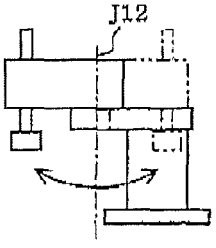 | |
| (3) COMBINATION C (THIRD BUTTON) | FOURTH AXIS 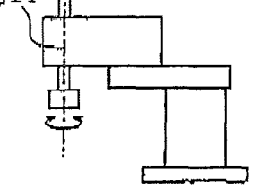 | THIRD AXIS 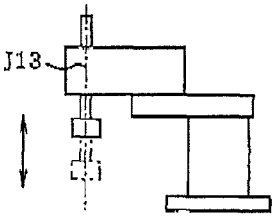 |

FIG.13
| SIX-AXIS ROBOT | OPERATION DIRECTION | |
| --- | --- | --- |
| | LATERAL DIRECTION (FIRST DIRECTION) | LONGITUDINAL DIRECTION (SECOND DIRECTION) |
| (1) COMBINATION A (FIRST BUTTON) | FIRST AXIS 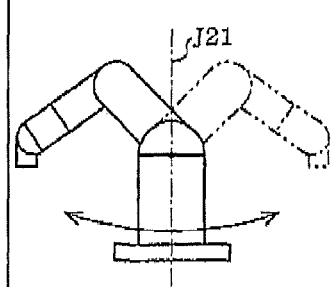 | SECOND AXIS 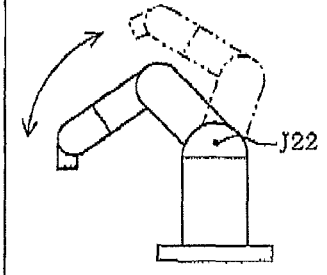 |
| (2) COMBINATION B (SECOND BUTTON) | FOURTH AXIS 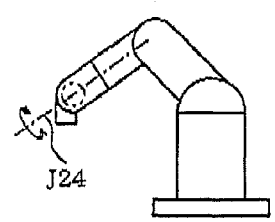 | THIRD AXIS 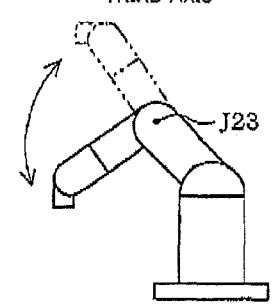 |
| (3) COMBINATION C (THIRD BUTTON) | SIXTH AXIS 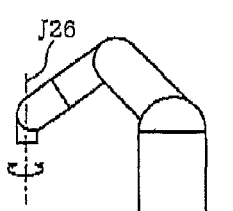 | FIFTH AXIS 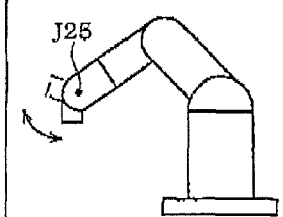 |

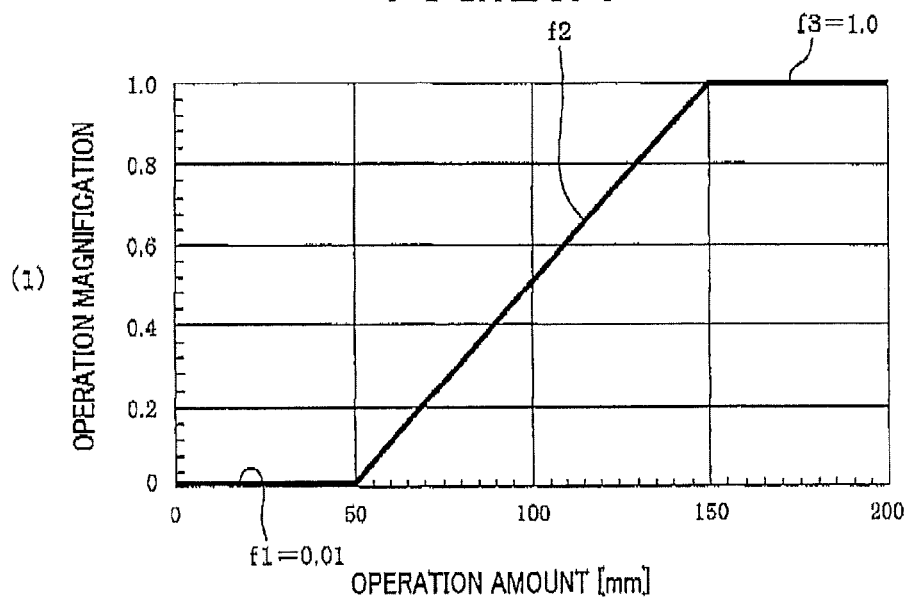
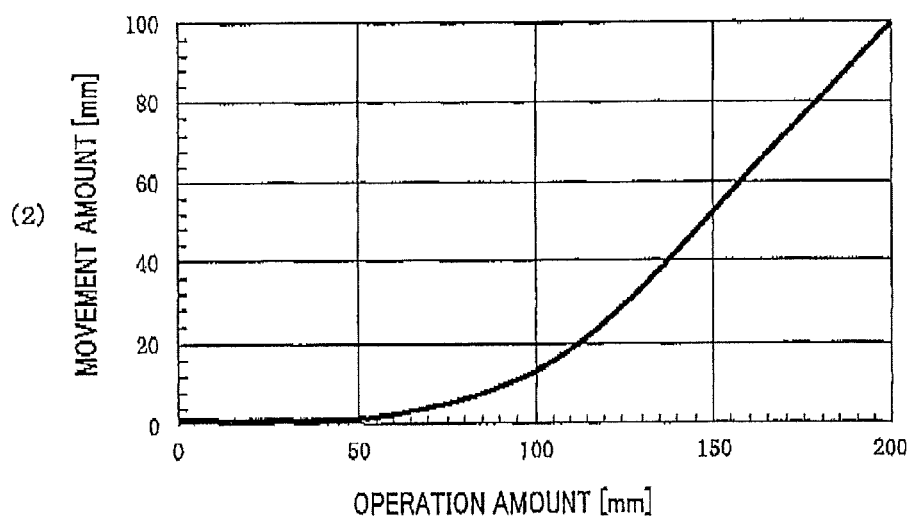

ROBOT OPERATION APPARATUS, ROBOT SYSTEM, AND ROBOT OPERATION PROGRAM

CROSS-REFERENCE TO RELATED APPLICATION

This application is based on and claims the benefit of priority from earlier Japanese Patent Application No. 2014-203054, filed Oct. 1, 2014, the description of which is incorporated herein by reference.

BACKGROUND

Technical Field

The present disclosure relates to a robot operation apparatus used for manually manipulating a robot, a robot system provided with the robot operation apparatus, and a robot operation program used for the robot system.

Related Art

In an industrial robot system, a robot can be manually operated (manual operation). Such operation is used, for example, in performing teaching. In this case, a user uses a pendant (teaching pendant), which is connected to a controller for controlling the robot, to manually operate the robot. For this purpose, the pendant is provided with various operation keys (e.g., keys composed of mechanical switches) (e.g., see JP-A-2006-142480).

The pendant includes a display which is typically provided with a touch panel that enables touch operation. If the manual operation can be conducted by touch operation by using such a touch panel, the dedicated operation keys are no longer needed to be provided. Thus, by enabling touch operation, the pendant is expected to be reduced in size (or increased in the screen size of the display) and reduced in cost. However, simply forming touch switches similar to the dedicated operation keys on the touch panel for replacement with the keys causes the problems as set forth below.

Specifically, in the case of physical operation keys, a user may be able to sense the keys by fingers to know the positions of the keys to be operated without looking at the pendant, although this may depend on the level of skill of the user. On the other hand, the positions of the touch switches formed on a touch panel cannot be sensed by fingers unlike the physical operation keys. In manually manipulating a robot, it is quite important for the sake of safety not to turn the user's eyes away from the robot, i.e. not to look at the pendant. However, when the operation keys are simply replaced with touch switches, the user needs to see the display of the pendant every time an operation is conducted. In such an occasion, the user cannot help turning his/her eyes away from the robot, which may lead to a concern that safety may be impaired.

SUMMARY

It is thus desired to provide a robot operation apparatus which is able to achieve manual operation of a robot through touch operation without impairing safety, and to provide a robot system provided with the robot operation apparatus and a robot operation program used for the robot system.

A first exemplary embodiment provides a robot operation apparatus that includes: a touch panel that receives a touch operation inputted from a user; a touch operation detector that detects a touch operation in a planar direction of the touch panel inputted from the user; a motion command generator that generates a motion command to operate an articulated robot having a plurality of driving axes based on a detection result of the touch operation detector. The robot operation apparatus achieves manual operation by touch operation. The robot which is an operated object is an articulated robot having a plurality of driving axes.

A four-axis horizontal articulated robot having four driving axes and a six-axis vertical articulated robot having six driving axes are used in industry. When such a robot is manually operated, a system of each axis, which is an operation mode for individually driving respective driving axes, may be operated. When a system of each axis of the four-axis robot is manually operated, the robot operation apparatus needs to be able to discriminate at least four types of operation input. When a system of each axis of the six-axis robot is manually operated, the robot operation apparatus needs to be able to discriminate at least six types of operation input. Here, a general touch panel often detects X and Y directions inputted from a user on a screen which is assumed to be an X-Y plane, i.e., two-dimensionally inputted in such a manner that the user traces the screen on the touch panel. Thus, when a touch panel is used as the robot operation apparatus, it is necessary for the user to operate the robot while switching between axes of the robot by two-dimensional input, i.e., two types of operation inputs in the touch panel. In addition, it is necessary for the user to intuitively perform an operation without the necessity of looking at the screen.

The robot operation apparatus of the exemplary embodiment thus includes a selection operation detector that is integrally or separately provided with the touch panel and detects a selection operation in the touch panel inputted from the user. The selection operation refers to a user's operation of a button displayed on the touch panel or a button provided separately from the touch panel, or the like, the button being an object to be detected by the selection operation detector. The motion command generator can perform a selection process, an operation determination process, a first motion command generation process, and a second motion command generation process.

The selection process is a process to select, based on the detection result of the touch operation detector, one of combinations of the driving axes as an operation object from among preset combinations of the driving axes including at least one of: i) a first driving axis of the robot associated with a drag operation in a first direction for the touch panel; or ii) a second driving axis of the robot associated with a drag operation in a second direction intersecting with the first direction. The operation determination process is a process to determine whether a direction of the drag operation is the first direction or the second direction, if the touch operation detected by the touch operation detector is the drag operation.

In this case, the drag operation refers to an operation in which a finger of a user is moved while touching with the touch panel. In the drag operation, start and end points of operation on the touch panel are determined. The start point refers to a position at which the user touches the touch panel with the user's finger. The end point refers to a position at which the user releases the user's finger from the touch panel. In this case, the drag operation includes a so-called flick operation in which the user flicks the user's finger on the touch panel.

The first motion command generation process is a process to generate, if the direction of the drag operation is the first direction, a first motion command to drive the first driving axis of the robot associated with the drag operation in the first direction among the combinations of driving axes selected in selection process. The second motion command generation process is a process to generate, if the direction of the drag operation is the second direction, a second motion command to drive the second driving axis of the robot associated with the drag operation in the second direction among the combinations of driving axes selected in selection process.

According to the exemplary embodiment, the user is able to perform the selection operation to select combinations of the driving axes including at least one of: i) the first driving axis of the robot associated with a drag operation in a first direction for the touch panel; or ii) the second driving axis of the robot associated with a drag operation in a second direction intersecting with the first direction. After selecting a combination of the driving axes through the selection operation, the user performs the drag operation in the first direction or the second direction. As a result, the user is able to drive the driving axis corresponding to the direction of the drag operation, among the selected combination of the driving axes. With this configuration, the robot operation apparatus can receive two types of two-dimensional inputs in the touch panel, i.e., two types of inputs, to distinguish and determine two or more types of operation inputs. Accordingly, the touch panel can be used in the robot operation apparatus that requires two or more operation inputs.

According to the configuration, the user is able to selectively use the drag operations in the first direction and the second direction to thereby drive the first driving axis of the robot corresponding to the drag operation in the first direction or the second driving axis of the robot corresponding to the drag operation in the second direction. Thus, while using the touch panel, the robot operation apparatus enables the user to intuitively perform an operation without the necessity of looking at the screen. As a result, manual operation of the robot can be achieved by touch operation with improved operability and without impairing safety. Further, the improved operability can contribute to reducing time taken for teaching.

In the robot operation apparatus of the exemplary embodiment; the first direction may be a lateral direction in the touch panel; the second direction may be a longitudinal direction in the touch panel; the first driving axis of the robot associated with the drag operation performed in the first direction may be a driving axis that moves a hand of the robot in a horizontal direction with respect to a motion reference plane of the robot; and the second driving axis of the robot associated with the drag operation performed in the second direction may be a driving axis that moves a hand of the robot in a vertical direction with respect to a motion reference plane of the robot.

According to the configuration, the robot operation apparatus enables the robot to perform a motion which the user can easily associate with the drag operation in the lateral direction or the longitudinal direction. When the drag operation is performed in the lateral direction, the robot operation apparatus enables the robot to perform a motion which the user can easily associate with the drag operation in the lateral direction, e.g., to drive a driving axis that moves a hand of the robot in a horizontal direction. The evidence that the drag operation in the lateral direction is associated with a horizontal movement of a hand of the robot is based on, e.g., human visual and tactual information and is as follows. Specifically, a user usually holds the robot operation apparatus at a position between the user's waist and chest. In this posture, the lateral direction for the touch panel substantially corresponds to the horizontal direction. Accordingly, the user can easily recognize the lateral operation on the screen of the touch panel, as being correlated to the horizontal movement of the hand of the robot.

When the drag operation is performed in the longitudinal direction, the robot operation apparatus enables the robot to perform a motion which the user can easily associate with the drag operation in the longitudinal direction, e.g., to drive a driving axis that moves a hand of the robot in a vertical direction. The evidence that the drag operation in the longitudinal direction is associated with a vertical movement of a hand of the robot is based on, e.g., human visual and tactual information and is as follows. Specifically, as described above, a user usually holds the robot operation apparatus at a position between the user's waist and chest. In this case, taking account of the visibility and operability of the touch panel, the user naturally holds the robot operation apparatus with a posture of having the screen of the touch panel inclined downward toward the user. When the user holds the robot operation apparatus with this posture, the longitudinal direction, i.e. the up-and-down direction, of the robot operation apparatus corresponds to the vertical direction, i.e. up-and-down direction, of the hand of the robot. Accordingly, the user can easily recognize the longitudinal operation on the screen of the touch panel, as being correlated to the vertical movement of the hand of the robot.

In this case, the lateral direction and the longitudinal direction do not need to be strictly perpendicular to each other, i.e., they are perpendicular to each other while allowing errors to a certain degree. The expression "a hand of a robot moves in a horizontal direction" does not mean that a hand of a robot moves in a completely horizontal direction, but it is enough to be able to give an impression that a hand of a robot moves in a horizontal direction, to a user. Similarly, the expression of "a hand of a robot moves in a lateral direction" does not mean that a hand of a robot moves in a completely lateral direction, but it is enough to be able to give an impression that a hand of a robot moves in a lateral direction, to a user.

As described above, according to the robot operation apparatus, a user can more intuitively perform operation. As a result, manual operation of the robot can be achieved by touch operation with more improved operability and without impairing safety. Further, the improved operability can contribute to reducing time taken for teaching.

In the robot operation apparatus of the exemplary embodiment, the selection process may be a process to detect an operation for a button displayed on the touch panel or a button different from a button displayed on the touch panel. According to this, a user can operate the button displayed on the touch panel or a button different from the button displayed on the touch panel, thereby being able to select a combination of the driving axes which are objects of operation. In this case, the user may look at the button for a little while to operate them. However, in a mode of using a normal robot, the operation for selecting (switching) the driving axes as objects of operation is mostly performed before the robot is driven, i.e. when the robot is not yet in motion. By designing ideas in the settings such as of the shape, size and color of the button, the time for the user to look at the button can be shortened. Thus, if the user looks at the button displayed on the touch panel or the button different from the button displayed on the touch panel for a little while to operate them, it is considered there is no concern for impairing safety.

In fact, with such a configuration, a user is permitted to have a purpose of operating the button to switch the combinations of the driving axes as objects of operation. Accordingly, the user can be easily conscious of the operation for the button being performed for selecting a combination of the driving axes as objects of operation. Thus, this configuration can reduce the risk of causing erroneous motion of the robot with a selection of erroneous objects of operation by the user's erroneous operation. As a result, manual operation of the robot can be achieved by touch operation with improved operability and without impairing safety. Further, the improved operability can contribute to reducing time taken for teaching.

The robot operation apparatus of the exemplary embodiment may include a casing in which the touch panel is disposed. The casing may be held by a hand of a user. The selection operation detector may detect operation for a plurality of buttons displayed on the touch panel. The plurality of buttons may be arranged inside a predetermined range which is adjacent to a handheld part that is assumed to be held by a user in holding the casing by hand. In other words, when a user holds the casing, the thumb of the hand holding the casing is located on a front face of the casing, i.e. on a front face side of the touch panel. Therefore, within a movable range of the thumb of the hand holding the casing, the touch panel can be operated by the thumb. In this case, on the touch panel, the user is able to move the thumb of the hand holding the casing, drawing an arc with the base of the thumb being used as a fulcrum. Accordingly, in a state where the casing is held, the movable range of the thumb is inside an arc whose radius corresponds to the length of the thumb from the base thereof as a fulcrum.

Specifically, the predetermined range where the plurality of buttons are provided is ensured to reside, for example, in an area that is considered to be a movable range of the thumb of the hand holding the casing, i.e. an area inside the arc mentioned above. Accordingly, a user is able to operate the plurality of buttons arranged within the predetermined range, without releasing the hand from the casing. Thus, the user is able to operate the touch panel with both hands. As a result, the operability is further improved. With the improvement in the operability, the time required for teaching can be further shortened.

In the robot operation apparatus of the exemplary embodiment, the robot as an object of operation may include a base disposed on a set-up surface, a shoulder disposed so as to be rotatable relative to the base by a first axis, the lower arm disposed so as to be rotatable relative to the shoulder by a second axis, a first upper arm disposed so as to be rotatable relative to the lower arm by a third axis, a second upper arm disposed so as to be rotatable relative to the first upper arm by a fourth axis, a wrist disposed so as to be rotatable relative to the second upper arm by a fifth axis, and a flange disposed so as to be rotatable relative to the wrist by a sixth axis. That is, the robot operation apparatus operates a six-axis robot as an object of operation. The combinations of driving axes may include at least one of: a first combination of the driving axes configured by: the first axis associated with the drag operation in the first direction; and the second axis associated with the drag operation in the second direction; a second combination of the driving axes configured by: the fourth axis associated with the drag operation in the first direction; and the third axis associated with the drag operation in the second direction; or a third combination of the driving axes configured by: the sixth axis associated with the drag operation in the first direction; and the fifth axis associated with the drag operation in the second direction.

In this case, the first axis and the second axis are driving axes disposed on the base side of the robot. Thus, when the first axis or the second axis is driven, a movement amount of the hand of the robot is relatively large. In other words, a movement amount of the hand of the robot when the first axis is driven is similar to a movement amount of the hand of the robot when the second axis is driven. The sixth axis and the fifth axis are driving axes disposed on the hand side of the robot. Thus, when the sixth axis or the fifth axis is driven, a movement amount of the hand of the robot is relatively small. In other words, a movement amount of the hand of the robot when the sixth axis is driven is similar to a movement amount of the hand of the robot when the fifth axis is driven. The fourth axis and the third axis are driving axes disposed at the intermediate position between the base side and the hand side of the robot. Thus, when the fourth axis or the third axis is driven, a movement amount of the hand of the robot is in a medium level. In other words, a movement amount of the hand of the robot when the fourth axis is driven is similar to a movement amount of the hand of the robot when the third axis is driven.

In this way, each of the combinations is configured by the driving axes whose movement amount, when driven, is similar to each other. Accordingly, a user is able to select a combination of the driving axes according to the movement amount of the hand of the robot, thereby improving operability. For example, even when a user inputs a drag operation in an erroneous operation direction, an occurrence of movement unexpected by the user can be reduced because the respective driving axes configuring the selected combination are driven to move the robot with a similar movement amount. As a result, safety can be further improved.

In the robot operation apparatus of the exemplary embodiment, the operation determination process may include a process to determine a movement amount of a finger of the user in the drag operation, if the touch operation detected by the touch operation detector is the drag operation. The motion command generator may be configured to perform a speed calculation process to calculate a movement speed of the robot, based on the movement amount of the finger. According to this configuration, the movement amount of the finger of the user in the drag operation is correlated to the movement speed of the robot. Accordingly, a user is able to adjust the movement speed of the robot by adjusting the movement amount of the finger in the drag operation. Therefore, the user is able to intuitively perform operation to thereby improve operability. As a result, safety is improved, while time taken for teaching is shortened.

In the robot operation apparatus of the exemplary embodiment, the motion command generator may be configured to perform a movement amount calculation process to calculate a movement amount of the robot, based on the movement amount of the finger. According this configuration, a user is able to adjust the movement amount, i.e. the movement distance of the robot by adjusting the movement amount of finger in the drag operation. The speed calculation process may a process to determine the movement speed of the robot, based on a value obtained by dividing the movement amount of the finger by time taken for inputting the drag operation. According to this configuration, a user is able to adjust the movement speed of the robot by adjusting time taken for inputting a drag operation.

Accordingly, in inputting a drag operation, a user is able to adjust both of the movement speed and the movement amount of the robot by adjusting the movement amount L and the input time of the drag operation. In other words, the user is able to adjust both the movement speed and the movement amount of the robot by one drag operation. Thus, the user is able to intuitively perform operation. Further, in determining a movement speed and a movement amount of the robot, a user does not have to do a plurality of operations which are, for example, an operation for determining a movement speed of the robot, and an operation for determining a movement amount of the robot. Accordingly, operation is simplified and operability is improved. Resultantly, safety is improved, while time required for teaching is reduced.

In the robot operation apparatus of the exemplary embodiment, the operation determination process may include a process to determine a movement amount of a finger in a drag operation detected by the touch operation detector. The move command generator may perform a movement amount determination process. The movement amount determination process may determine a movement amount of the robot by setting a magnification for determining a movement amount of the robot by magnifying or reducing the movement of the finger in the drag operation determined in the operation determination process, such that: i) the magnification is set to a first magnification of a constant value smaller than 1 from when the drag operation starts at a start point for operation until when the drag operation passes a first section; and ii) the magnification is set to a value larger than the first magnification after the drag operation passes the first section.

According to this configuration, when the drag operation of the user is performed within the first section, the robot can move with the first magnification that is a magnification of a constant value smaller than 1. In other words, the robot can perform a fine motion by repeating the drag operation of the user within the first section. When the drag operation is performed by the user so as to exceed the first section, the robot can move with the magnification larger than the first magnification in a part exceeding the first section. In other words, the robot can perform a coarse motion by performing the drag operation of the user so as to exceed the first section.

In this way, the user is able to move the robot with different magnifications by one drag operation. Thus, both the fine and coarse motions of the robot can be achieved by one drag operation. As a result, the user can realize both the fine and coarse motions of the robot without a special operation to switch between the fine and coarse motions of the robot. Accordingly, operation is simplified and operability is improved. Resultantly, safety is improved, while time required for teaching is reduced.

In the robot operation apparatus of the exemplary embodiment, the movement amount determination process may be a process to determine the movement amount of the robot: i) by setting the magnification to a second magnification from when the drag operation moves to pass the first section until when the drag operation passes the second section; and ii) by setting the magnification to a third magnification of a constant value after the drag operation passes the second section. According to this, the robot can perform fine motion with the first magnification smaller than 1, by repeating the drag operation of the user within the first section. The robot can perform coarse motion with the second magnification or the third magnification that is larger than the first magnification, by performing the drag operation of the user so as to exceed the first section.

The second magnification may be a value that continuously increases within a range from the first magnification to the third magnification in accordance with the movement amount of the drag operation. According to this, the second magnification, which is a magnification between a fine motion using the first magnification and a coarse motion using the third magnification, continuously increases within a range from the first magnification to the third magnification in accordance with the movement amount of the finger in the drag operation. In other words, the second magnification, which continuously increases, connects between the first magnification of a constant value and the third magnification of a constant value. Thus, the magnification, which is used for determining the movement amount of the robot with respect to the operation amount of the finger in the drag operation, changes from the first magnification via the second magnification, which gradually changes, to the third magnification. Accordingly, the magnification for determining the movement amount of the robot can be prevented from changing rapidly from the first magnification to the third magnification. In other words, the movement of the robot can be prevented from changing rapidly from the fine motion from the coarse motion. This can reduce a sudden speed change of the robot caused by a sudden change of the magnification unintended by a user. As a result, safety can be more improved.

A second exemplary embodiment provides a robot system that includes: a four-axis horizontal articulated robot having four driving axes; a controller that controls motion of the robot; and the robot operation apparatus of the first exemplary embodiment. The four-axis horizontal articulated robot is able to perform motion of a system of respective axes. As described above, the robot operation apparatus can generate a motion command to perform motion of a system of respective axes based on a manual operation of a user. According to this configuration, a motion required for a robot being an object to be operated can be achieved by manual operation.

A third exemplary embodiment provides a robot system that includes: a six-axis vertical articulated robot having six driving axes; a controller that controls motion of the robot; and the robot operation apparatus of the first exemplary embodiment. The six-axis vertical articulated robot is also able to perform motion of a system of respective axes. As described above, the robot operation apparatus can generate a motion command to perform motion of a system of respective axes based on a manual operation of a user. According to this configuration, a motion required for a robot being an object to be operated can be achieved by manual operation.

A fourth exemplary embodiment provides a computer-readable storage medium storing a robot operation program performed by a computer embedded in the robot operation apparatus of the first exemplary embodiment. According to this configuration, the robot operation program can be executed by a computer such as a general purpose tablet personal computer (PC) having a touch panel. Thus, the above-described functions of the robot operation apparatus can be added to, for example, a general purpose tablet PC.

BRIEF DESCRIPTION OF THE DRAWINGS

In the accompanying drawings:

FIG. 11 is a diagram illustrating specific examples of combinations A to C, according to a second embodiment;

FIG. 13 is a diagram illustrating specific examples of combinations A to C, according to the third embodiment;

FIG. 20A is a diagram illustrating a relationship between an amount of movement of finger and an operation magnification in a drag operation in an example different from FIG. 19A, according to the sixth embodiment; and FIG. 20B is a diagram illustrating a relationship between a movement amount of a finger and a movement amount of a robot in a drag operation in an example different from FIG. 19B, according to the sixth embodiment.

DESCRIPTION OF EMBODIMENTS

With reference to the accompanying drawings, hereinafter are described several embodiments.

First Embodiment

Referring to FIGS. 1 to 10, a first embodiment will be described.

Figure 1:
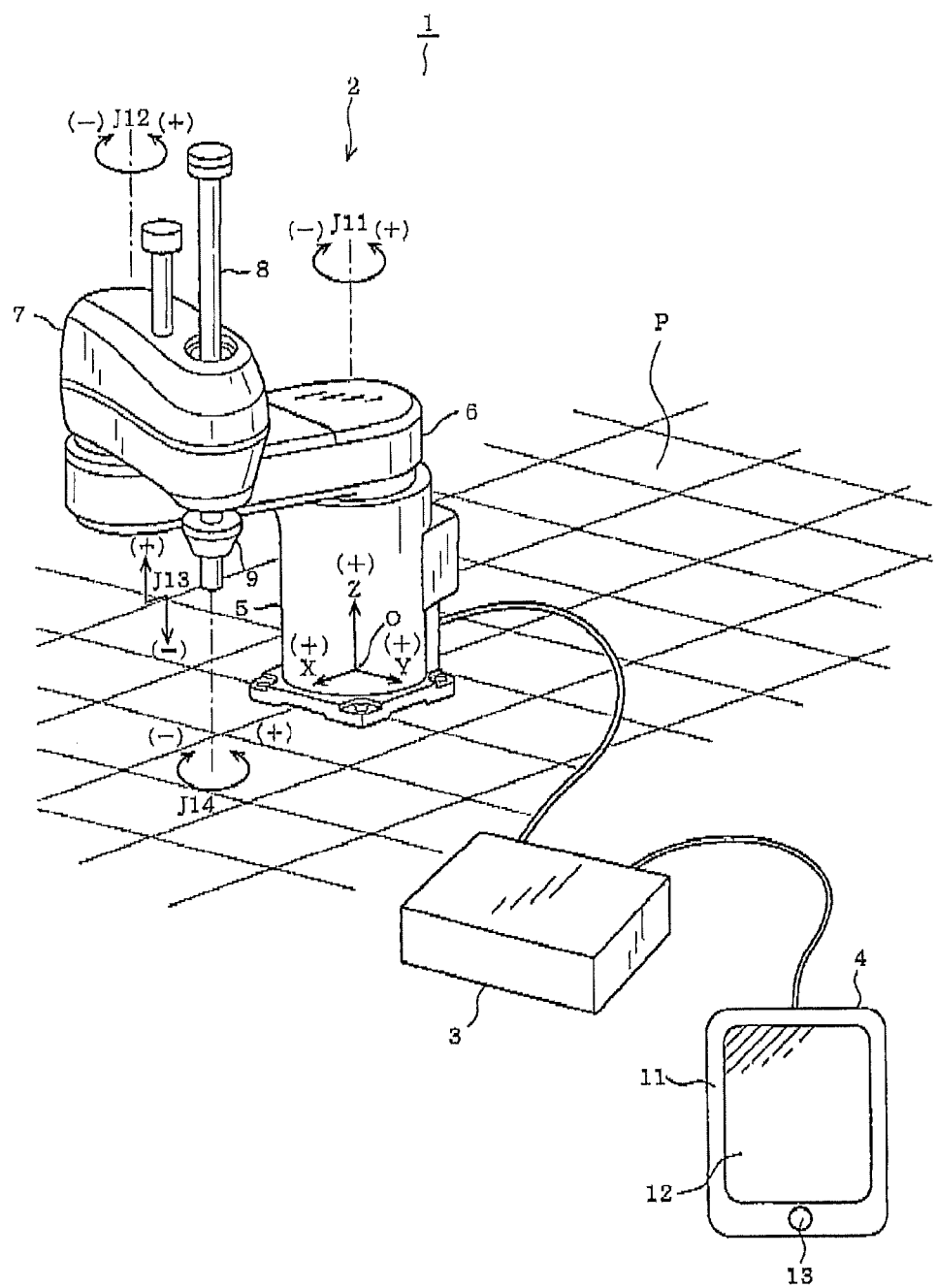
FIG. 1 is a diagram illustrating an example of a general configuration of a four-axis robot system, according to a first embodiment.

FIG. 1 shows a configuration of a robot system 1 for a generally used industrial robot. The robot system 1 includes a robot 2, a controller 3, and a teaching pendant 4 (corresponding to the robot operation apparatus). For example, the robot 2 is configured as a four-axis horizontal articulated robot. The robot 2 is able to operate on the basis of a unique robot coordinate system (three-dimensional orthogonal coordinate system composed of X-, Y- and Z-axes). In the robot coordinate system of the present embodiment, the center of a base 5 is defined to be an origin, an upper surface of a work table P is defined to be an X-Y plane, and a coordinate axis perpendicular to the X-Y plane is defined to be a Z-axis. The upper surface of the work table P is used for setting up the robot 2. In this case, the set-up surface corresponds to the motion reference plane. The motion reference plane is not limited to a set-up surface, but may be an optionally selected flat surface.

The robot 2 includes the base 5, a first arm 6, a second arm 7, and a shaft 8. The base 5 is fixed the upper surface (hereinafter also referred to as a set-up surface) of the work table P. The first arm 6 is connected onto the base 5 so as to be rotatable about a first axis J11 that has an axis center in the Z-axis (vertical axis) direction. The second arm 7 is connected onto a tip portion of the first arm 6 so as to be rotatable about a second axis J12 that has an axis center in the Z-axis direction. The shaft 8 is provided to a tip portion of the second arm 7 so as to be vertically and rotatably movable. An axis for vertically moving the shaft 8 is served by a third axis J13, while an axis for rotating the shaft 8 is served by a fourth axis J14. The shaft 8 has a tip portion (lower end portion) on which a flange 9 is positioned and detachably disposed.

The base 5, the first arm 6, the second arm 7, the shaft 8 and the flange 9 function as an arm of the robot 2. The arm has a tip to which an end effector (hand), not shown, is mounted. For example, when parts test or the like is conducted using the robot 2, a camera or the like is used as the end effector to capture an image of a part as an object. The plurality of axes (J11 to J14) provided to the robot 2 are driven by motors (not shown) that are provided for the respective axes. Each of the motors is provided in the vicinity thereof with a position detector (not shown) for detecting a rotation angle of the corresponding one of the axes.

The controller 3 for controlling the robot 2 is connected to the robot 2 via a connecting cable. The teaching pendant 4 is connected to the controller 3 via a connecting cable. Data communication is conducted between the controller 3 and the teaching pendant 4 via a communication interface (shown by reference numeral 10 in FIG. 2). Thus, various pieces of operation information inputted according to the user's operation are transmitted from the teaching pendant 4 to the controller 3. The controller 3 transmits various control signals or display signals to the teaching pendant 4, while supplying electric power for driving.

Once a signal for commanding manual operation is received from the teaching pendant 4, the controller 3 performs control so that the robot 2 can be manually operated. Further, once a signal for commanding automatic operation is received from the teaching pendant 4, the controller 3 starts an automatic program stored in advance so that the robot 2 is automatically operated.

Figure 3:
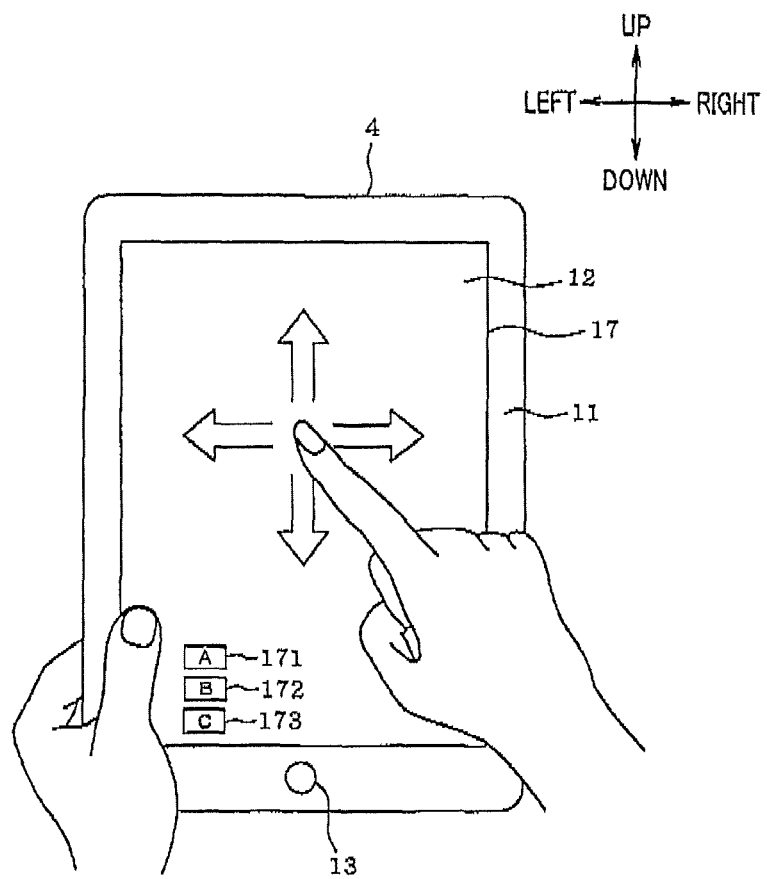
FIG. 3 is a diagram illustrating an example of operation using the teaching pendant.

The teaching pendant 4 is of a size that is suitable for being carried or hand held by a user. As shown in FIG. 3, the teaching pendant 4 is provided with a casing 11 which, for example, is in a thin and substantially rectangular box shape. The teaching pendant 4 includes a display 12 that is, for example, a liquid crystal display, which is located at a center portion on a front-face side of the casing 11. The display 12 is configured by a touch panel 17 to display various screens. The teaching pendant 4 has key switches 13, which are various physical switches, provided around the display 12. In FIGS. 1 and 3, one key switch 13 is shown. The key switch 13 may be substituted by a button displayed on the display 12 of the touch pane. 17. A user can perform various input operations through the touch panel 17 of the display 12 or the key switch 13.

Figure 2:
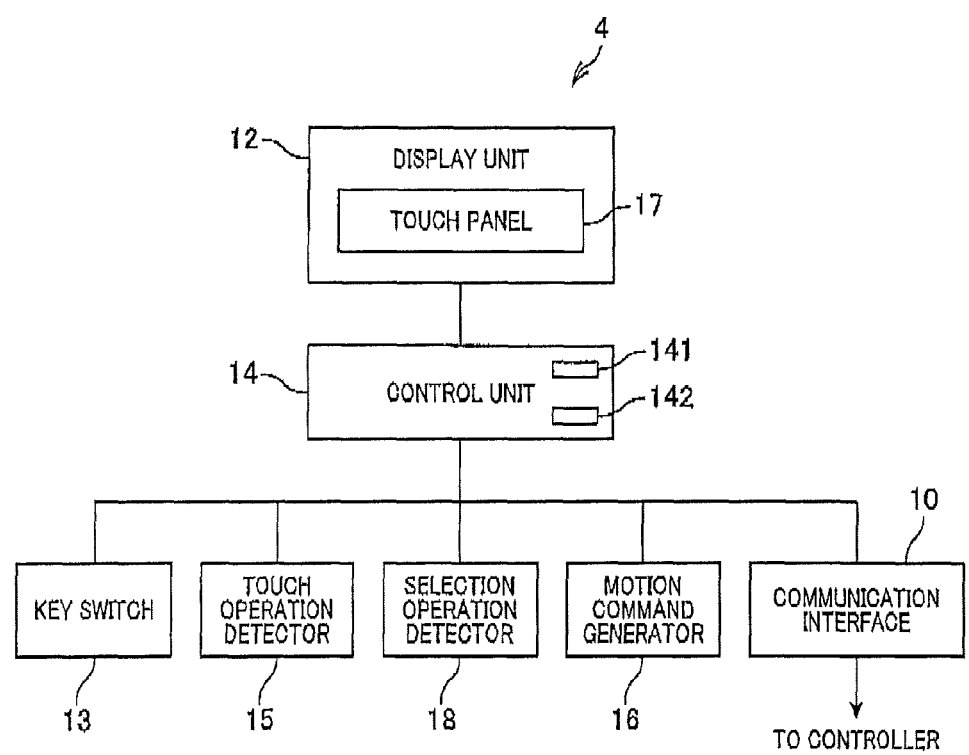
FIG. 2 is a block diagram illustrating an example of an electrical configuration of a teaching pendant, according to the first embodiment.

A user (operator) can carry out various functions such as of operating the robot 2 or making settings for the robot 2. Thus, the user can call up a control program stored in advance to start the robot 2 or set various parameters. Also, the robot 2 may be manually operated to carry out various teaching works. As necessary, the display 12 displays, for example, a menu screen, a setting input screen, a condition display screen, or the like. Referring to FIG. 2, an electrical configuration of the teaching pendant 4 is described.

The teaching pendant 4 includes the communication interface 10, the display 12 and the key switch 13 mentioned above, as well as a control unit 14, a touch operation detector 15, a motion command generator 16, and a selection operation detector 18. The control unit 14 is mainly configured by, for example, a central processing unit (CPU) 141, a read only memory (ROM), a random access memory (RAM), and a storage region 142, such as a rewritable flash memory, to thereby perform overall control of the teaching pendant 4. The storage region 142 stores a robot operation program. The control unit 14 executes the robot operation program in the CPU 141 to virtually realize by software the touch operation detector 15, the motion command generator 16, or the like. The touch operation detector 15 and the motion command generator 16 may be realized by hardware as an integrated circuit, for example, integrated with the control unit 14.

The touch operation detector 15 detects a touch operation for the touch panel 17. Specifically, the touch operation detector 15 is able to detect whether there is a touch operation or not, the position on the screen where the touch operation has been conducted (touch position), the time or type of the touch operation, and the like. In other words, the touch operation detector 15 is able to detect not only whether the touch operation is a drag operation or not, but also the time of the touch operation, or the movement direction of finger or the amount of movement of finger in the touch operation, or the like. In the present embodiment, the drag operation is taken to be conducted by one finger. Accordingly, the touch operation detector 15 is not required to identify the number of fingers in the touch operation. However, it may be so configured that the number of fingers is identified in the detection. In the touch panel 17, a two-dimensional orthogonal coordinate system is set. Based on the two-dimensional orthogonal coordinate system, the touch operation detector 15 can detect a touch position, the type of touch operation, a direction of movement (operation direction or dragging direction), an amount of movement (operation amount or amount of dragging), and the like. It should be noted that the drag operation refers to an operation in which a finger is moved in a state of being in touch with the touch panel 17.

The motion command generator 16 generates a motion command for manually manipulating the robot, on the basis of the touch operation detected by the touch operation detector 15. The motion command generated by the motion command generator 16 is provided to the controller 3 via the communication interface 10. Using the teaching pendant 4 configured in this way, the user is able to manually operate the robot 2 through the touch operation.

A longitudinal or lateral direction relative to the touch panel 17 is defined herein to be as follows. The longitudinal direction relative to the touch panel 17 refers to a longitudinal direction for a user to hold and operate the teaching pendant 4, i.e. an up-and-down direction, which corresponds to a longitudinal direction in the drawing paper of FIG. 3. In other words, the longitudinal direction is a concept including two directions which are upward and downward directions. Further, the lateral direction relative to the touch panel 17 refers to a direction perpendicular to the lateral direction mentioned above, i.e. a right-and-left direction, which corresponds to a lateral direction in the drawing paper of FIG. 3. In other words, a lateral direction relative to the touch panel 17 refers to a direction parallel to a front face of a user in a state where the user holds and operates the teaching pendant 4. Specifically, the lateral direction is a concept including two directions which are rightward and leftward directions. In these concepts, the longitudinal and lateral directions of the touch panel 17 refer to the directions, as viewed from the user, relative to the touch panel 17. In other words, when the posture of the touch panel 17 is changed such as by the teaching pendant 4 being turned round, the relative relationship between the longitudinal and lateral directions for the user remain unchanged.

Specifically, the longitudinal and lateral directions relative to the touch panel 17 are not absolute for the touch panel 17, and thus may be determined based on a relative positional relationship between a user and the teaching pendant 4. To this end, for example, the teaching pendant 4 may be configured as follows. Specifically, the teaching pendant 4 is equipped with a means, such as an acceleration sensor or a gyro sensor, for detecting a posture of itself. The teaching pendant 4 determines a longitudinal direction (up-and-down direction) and a lateral direction (right-and-left direction) on the touch panel 17, with reference to a gravitational direction or an initial posture. With this configuration, in the event that the posture of the teaching pendant 4 is changed, the longitudinal direction (up-and-down direction) and the lateral direction (right-and-left direction) on the touch panel 17 are retained to be constant as viewed from the user.

The selection operation detector 18 can detect a user's selection operation for the touch panel 17 or a button different from the touch panel 17. The selection operation refers to an operation for selecting a combination of driving axes for an object to be operated, or refers to a user's operation for a button displayed on the touch panel 17 or a button provided separately from the touch panel 17, or the like, as an object to be detected. In the present embodiment, the display 12 of the touch panel 17 displays a plurality of selection operation sections as objects to be detected, or three buttons 171 to 173 in this case. The three buttons 171 to 173 include a first button 171 designated with a letter A, a second button 172 designated with a letter B, and a third button 173 designated with a letter C.

The selection operation corresponds to a touch operation for the button 171, 172 or 173. In this case, the touch operation detector 15 and the selection operation detector 18 both detect a touch operation from a user for the touch panel 17. The selection operation sections as objects to be detected by the selection operation detector 18 are not limited to the buttons 171 to 173 displayed on the display 12 of the touch panel 17, but may be physical buttons, for example, which are provided separately from the touch panel 17.

A user can touch and operate any one of the buttons 171, 172 and 173 to select a combination of driving axes as objects to be operated. The control unit 14 stores in advance combinations of the driving axes, the combinations corresponding to the respective buttons 171 to 173. Each combination of driving axes include at least one of a driving axis corresponding to a drag operation in a first direction relative to the touch panel 17, and a driving axis corresponding to a drag operation in a second direction intersecting the first direction. In the present embodiment, the first and second directions are perpendicular to each other. The expression "the first and second directions are perpendicular to each other" does not refer to a geometrical state where the two line segments intersect with each other at 90°, but refers to a concept that the first and second directions intersect with each other at approximately 90°. Accordingly, the first and second directions do not have to be geometrically completely perpendicular to each other. In the present embodiment, the first direction is set to the lateral direction, while the second direction is set to the longitudinal direction.

Figure 4:
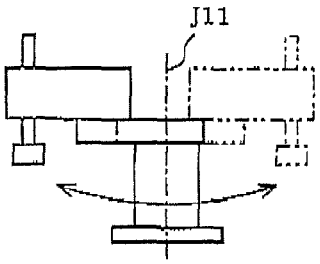
FIG. 4 is a diagram illustrating a specific example of combinations A to C, according to the first embodiment.

Referring to FIG. 4, specific examples of the combinations of driving axes will be described. The control unit 14 stores the combinations A, B and C that are the combinations of the driving axes, being correlated to the buttons 171, 172 and 173. In this case, each combination of driving axes corresponds to a combination configured by one or more driving axes among the four driving axes J11 to J14 of the robot 2. A drag operation may be conducted in a first direction (lateral direction) or second direction (longitudinal direction) in a state where any one of the combinations is selected from the three combinations. When such a drag operation is performed, the teaching pendant 4 is ensured to allow the robot to take a motion which is considered to be easily associated with the operation direction of the drag operation.

Specifically, as shown in FIG. 4 by (1), the first button 171 corresponds to the combination A. When the selection operation detector 18 detects that the first button 171 has been operated, the motion command generator 16 selects the combination A. In the combination A, the drag operation in a lateral direction (first direction) corresponds to the first axis J11, while the drag operation in a longitudinal direction (second direction) corresponds to the third axis J13.

Specifically, in a state where the combination A is selected with the operation of the first button 171, the motion command generator 16, when it detects a lateral drag operation, generates a motion command for driving the first axis J11. Further, in a state where the combination A is selected with the operation of the first button 171, the motion command generator 16, when it detects a longitudinal drag operation, generates a motion command for driving the third axis J13. Thus, the user is able to select the combination A by touch-operating the first button 171. Then, the user can perform a lateral drag operation in a state where the combination A is selected to thereby drive the first axis J11. Then, the user can perform a longitudinal drag operation in a state where the combination A is selected to thereby drive the third axis J13.

In this case, when the user drag-operates the touch panel 17 rightward, the motion command generator 16 drives the first axis J11 to a positive (+) direction to move the hand of the robot 2 rightward. On the other hand, when the user drag-operates the touch panel 17 leftward, the motion command generator 16 drives the first axis J11 to a negative (−) direction to move the hand of the robot 2 leftward. Further, when the user drag-operates the touch panel 17 upward, the motion command generator 16 drives the third axis J13 in a positive (+) direction to move the hand of the robot 2 upward, i.e. in a direction of departing from the motion reference plane P. On the other hand, when the user drag-operates the touch panel 17 downward, the motion command generator 16 drives the third axis J13 in a negative (−) direction to move the hand of the robot 2 downward, i.e. in a direction of nearing the motion reference plane P.

It is considered that the user can easily associate the driving of the first axis J11 with the lateral drag operation, and the driving of the third axis J13 with the longitudinal drag operation. For example, the evidence that the driving of the first axis J11 is associated with the lateral drag operation is as follows. Specifically, in the four-axis horizontal articulated robot 2, the first axis J11 is a rotation axis extending in a vertical direction. Accordingly, when the first axis J11 is driven, the hand of the robot 2 is moved in a horizontal direction centering on the first axis J11. In manually manipulating the robot 2, the user is apt to see the robot 2 from slightly above in a horizontal direction. In this case, for the user, the hand of the robot 2 appears to move in a horizontally lateral direction. Accordingly, the user's operation direction (lateral direction) coincides with the movement direction of the hand of the robot 2. Thus, the user can easily recognize that the movement motion of the hand, with the first axis J11 being driven, is correlated with the lateral operation for the touch panel 17. In this way, the user can easily recognize the movement direction of the hand of the robot 2 as being correlated to the direction of the drag operation of the user.

Figure 5:
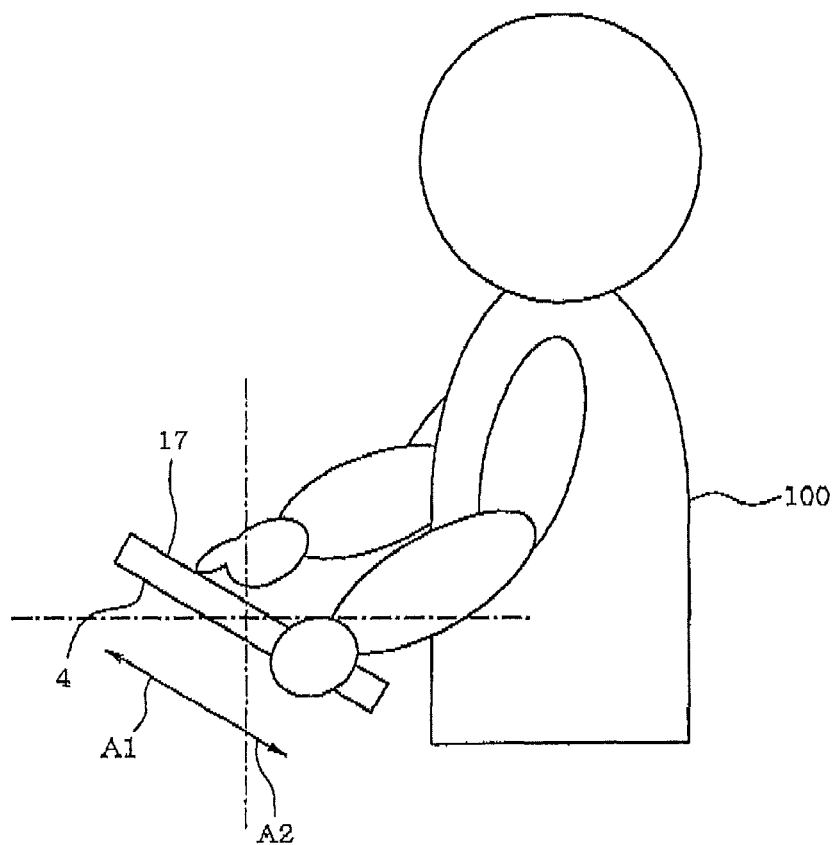
FIG. 5 is a diagram illustrating an example of a user's posture in holding the teaching pendant.

Further, for example, the evidence that the driving of the third axis J13 is associated with the longitudinal drag operation is as follows. Specifically, the third axis J13 is a driving axis for moving the hand of the robot 2 in a direction perpendicular to the motion reference plane P, i.e. in an up-and-down direction relative to a gravitational direction, in this case. As shown in FIG. 5, a user 100 usually holds the teaching pendant 4 at a position between the user 100's waist and chest. In this case, taking account of the visibility and operability of the touch panel 17, the user 100 naturally holds the teaching pendant 4 with a posture of having the screen of the touch panel 17 inclined downward toward the user 100. When the user 100 holds the teaching pendant 2 with this posture, the longitudinal direction, i.e. the up-and-down direction, of the teaching pendant 4 coincides with the vertical direction, i.e. up-and-down direction, of the hand of the robot 2. In this case, in FIG. 5, the upward direction of the teaching pendant 4 is indicated by the arrow A1, while the downward direction is indicated by the arrow A2. Accordingly, the user 100 can easily recognize the longitudinal operation on the screen of the touch panel 17, as being correlated to the vertical movement of the hand of the robot 2 with the third axis J13 being driven.

As shown in FIG. 4 by (2), the second button 172 corresponds to the combination B. When the selection operation detector 18 detects that the second button 172 has been operated, the motion command generator 16, selects the combination B. In the combination B, a drag operation in a lateral direction (first direction) corresponds to the second axis J12. On the other hand, a drag operation in a longitudinal direction (second direction) corresponds to none of the driving axes.

Specifically, the motion command generator 16, when it detects a lateral drag operation in a state where the combination B is selected with the operation of the second button 172, generates a motion command for driving the second axis J12. On the other hand, the motion command generator 16, when it detects a longitudinal drag operation in a state where the combination B is selected with the operation of the second button 172, generates no motion command Thus, by touch-operating the second button 172, the user is able to select the combination B. Then, when the user performs a lateral drag operation in a state where the combination B is selected, the second axis J12 can be driven.

In this case, when the user drag-operates the touch panel 17 rightward, the motion command generator 16 drives the second axis J12 in a positive (+) direction to thereby move the hand of the robot 2 rightward. On the other hand, when the user drag-operates the touch panel 17 leftward, the motion command generator 16 drives the second axis J12 in a negative (−) direction to thereby move the hand of the robot 2 leftward.

It is considered that the user can easily associate the driving of the second axis J12 with the lateral drag operation. The evidence is similar to the case of the first axis J11 described above. Specifically, in the four-axis horizontal articulated robot 2, the second axis J12 corresponds to a rotary shaft extending in a vertical direction. Accordingly, when the second axis J12 is driven, the hand of the robot 2 is moved in a horizontal direction centering on the second axis J12. Accordingly, similar to the case of the first axis J11, in the case of the second axis J12 as well, the user's operation direction (lateral direction) coincides with the movement direction of the hand of the robot 2. Thus, the user can easily recognize the lateral operation of the touch panel 17, as being correlated to the movement motion of the hand with the second axis J12 being driven. In this way, the user can easily recognize the movement direction of the hand of the robot 2 as being correlated to the direction of the drag operation of the user.

As shown in FIG. 4 by (3), the third button 173 corresponds to the combination C. When the selection operation detector 18 detects that the third button 173 has been operated, the motion command generator 16 selects the combination C. In the combination C, a drag operation in a lateral direction (first direction) corresponds to the fourth axis J14. On the other hand, a drag operation in a longitudinal direction (second direction) corresponds to none of the driving axes.

Specifically, the motion the motion command generator 16, when it detects a lateral drag operation in a state where the combination C is selected with the operation of the third button 173, generates a motion command for driving the fourth axis J14. On the other hand, the motion command generator 16, when it detects a longitudinal drag operation in a state where the combination C is selected with the operation of the third button 173, generates no motion command Thus, by touch-operating the third button 173, the user is able to select the combination C. Then, when the user performs a lateral drag operation in a state where the combination C is selected, the fourth axis J14 can be driven.

In this case, when the user drag-operates the touch panel 17 rightward, the motion command generator 16 drives the fourth axis J14 in a positive (+) direction to thereby rotate the hand of the robot 2 rightward. On the other hand, when the user drag-operates the touch panel 17 leftward, the motion command generator 16 drives the fourth axis J14 in a negative (−) direction to thereby rotate the hand of the robot 2 leftward.

It is considered that the user can easily associate the driving of the fourth axis J14 with the lateral drag operation. For example, the evidence is as follows. Specifically, the fourth axis J14 is for rotating the hand of the robot 2. The robot 2 is manually operated mostly for conducting fine adjustment of the robot 2. When the hand of the robot 2 is seen from a horizontal direction, one point in the hand of the robot 2 appears to linearly move in a horizontal direction with the rotation of the hand of the robot 2. Accordingly, it is considered that the user can associate the rotating motion of the hand of the robot 2 with the lateral operation for the touch panel 17. Thus, the user can easily recognize the lateral operation for the touch panel 17 as being correlated to the rotating motion of the hand of the robot 2.

To achieve the motions described above, the motion command generator 16 can perform a selection process, an operation determination process, a first motion command generation process, and a second motion command generation process. In the selection process, the detection result of the selection operation detector 18 is used as a basis to select one combination as an operation object from among the combination of the driving axes set in advance. In the operation determination process, if the touch operation detected by the touch operation detector 15 is a drag operation, it is determined whether the direction of the drag operation is the first direction (lateral direction) or the second direction (longitudinal direction).

In the first motion command generation process, if the direction of the drag operation is the first direction (lateral direction), a motion command suitable for the first direction is generated. Specifically, a motion command is generated for driving a driving axis (any one of the first, second and fourth axes J11, J12 and J14 in this case) corresponding to the drag operation in the first direction (lateral direction), from among the driving axes selected in the selection process. In the second motion command generation process, if the direction of the drag operation is the second direction (longitudinal direction), a motion command suitable for the second direction is generated. Specifically, a motion command is generated for driving a driving axis (third axis J13 or none of the axes in this case) corresponding to the drag operation in the longitudinal direction, from among the combinations of the driving axes selected in the selection process.

Figure 6:
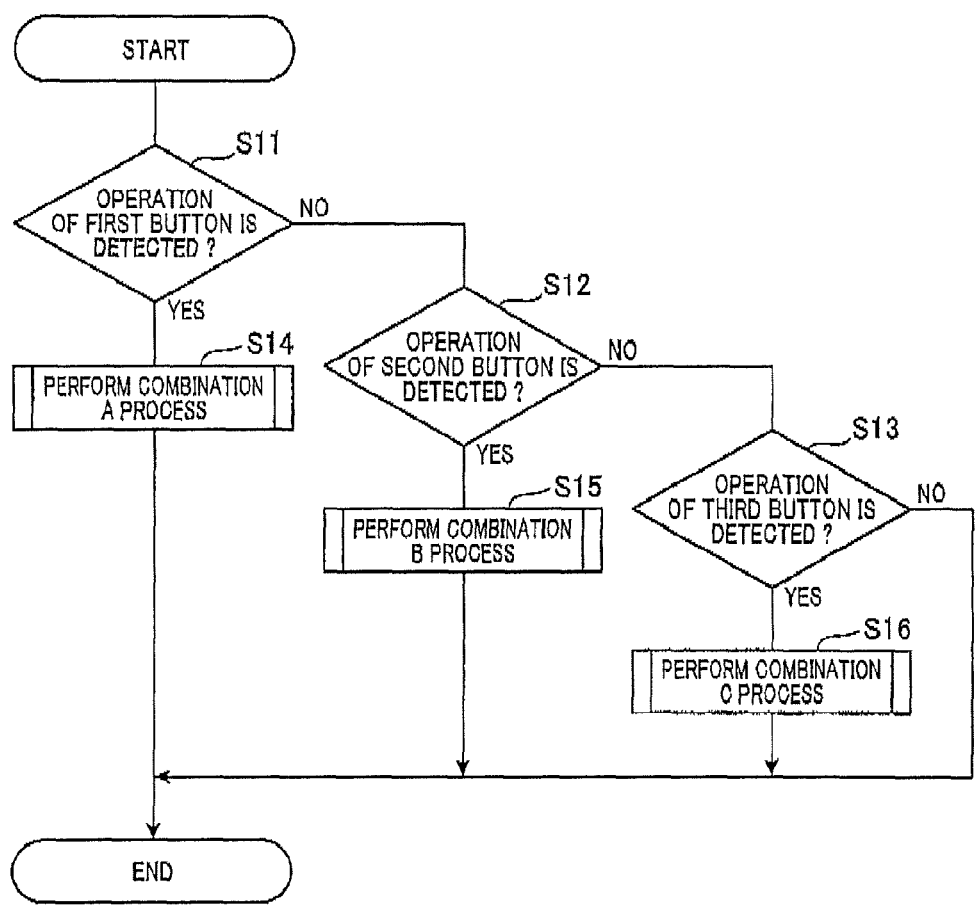
FIG. 6 is a flow diagram illustrating an example various processing steps performed by a motion command generation section, according to the first embodiment.

Once the robot operation program is executed by the control unit 14, the motion command generator 16 performs a process shown in FIG. 6. First, as the selection process, the motion command generator 16 performs steps S11, S12 and S13. At step S11, the motion command generator 16 determines whether or not the first button 171 has been operated. If the first button 171 is detected to have been operated (YES at step S11), the motion command generator 16 allows the process to proceed to step S14 to perform a combination A process.

Figure 7:
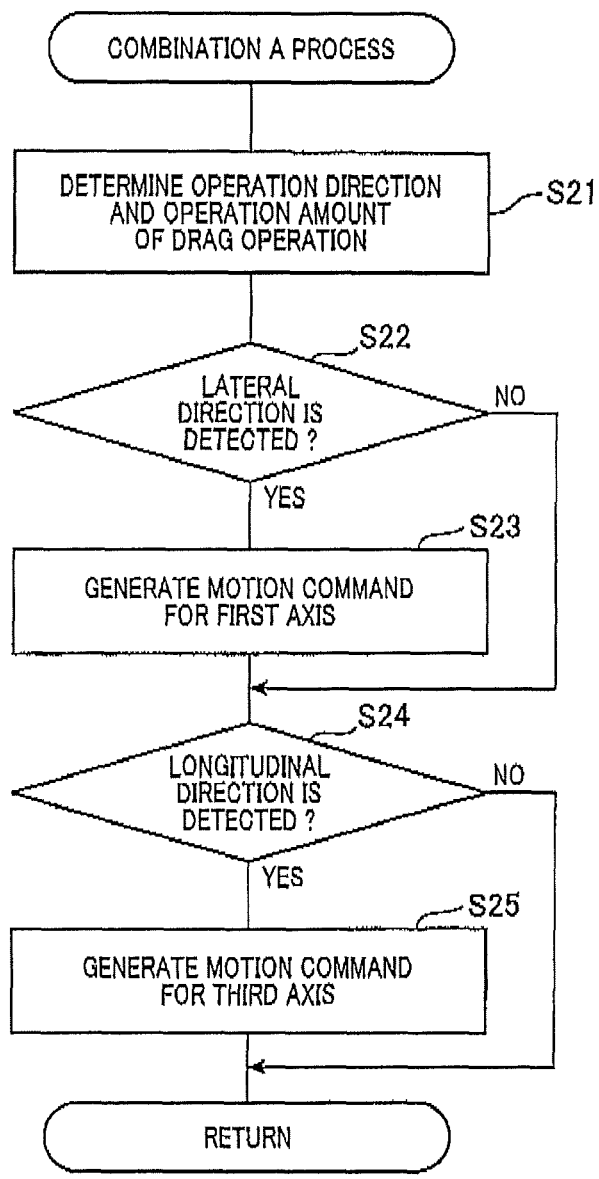
FIG. 7 is a flow diagram illustrating an example of a process for a combination A performed by the motion command generation section.

When the process shown in FIG. 7 is performed as the combination A process, the motion command generator 16 firstly determines, at step S21, an operation direction and an operation amount of the drag operation. Step S21 corresponds to the operation determination process. Then, at step S22, the motion command generator 16 determines whether or not the direction of the drag operation is a lateral direction (first direction) on the basis of the determination made at step S21. Then, if the direction of the drag operation is a lateral direction (first direction) (YES at step S22), the motion command generator 16 allows the process to proceed to step S23 to generate a motion command for driving the first axis J11. On the other hand, if the direction of the drag operation is not the lateral direction (first direction) (NO at step S22), control proceeds to step S24. Steps 22 and S23 correspond to the first motion command generation process.

Then, at step S24, the motion command generator 16 determines whether or not the direction of the drag operation is a longitudinal direction (second direction) on the basis of the determination result obtained at step S21. If the direction of the drag operation is a longitudinal direction (second direction) (YES at step S24), the motion command generator 16 allows the process to proceed to step S25 to generate a motion command for driving the third axis J13. Then, the motion command generator 16 terminates the combination A process (return). On the other hand, if the drag operation direction is not a longitudinal direction (second direction) (NO at step S24), the motion command generator 16 terminates the combination A process (return). After that, the motion command generator 16 germinates the series of processing steps shown in FIG. 6. Steps S24 and S25 correspond to the second motion command generation process.

The direction of drag operation can be oblique, i.e. a mixture of lateral-direction components and longitudinal-direction components. In this case, for example, the motion command generator 16 compares the lateral-direction components with the longitudinal-direction components, and determines the components having a large proportion to have precedence over the other components. Specifically, if the direction of the drag operation is oblique, the motion command generator 16 compares the lateral-direction components with the longitudinal-direction components. If the lateral-direction components are more than the longitudinal-direction components, the direction of the drag operation is determined to be lateral. If the longitudinal-direction components are more than the lateral-direction components as a result of the comparison, the direction of the drag operation is determined to be longitudinal. According to the configuration, if there is a runout to some extent in the direction of the user's drag operation, the operation direction can be taken to be the direction desired by the user. As a result, the operability is improved.

When the direction drag operation is oblique, the motion command generator 16 may detect the lateral- and longitudinal-direction components, based on which the motion command generator 16 may generate a motion command for driving the first and third axes J11 and J13. According to the configuration, the user's oblique drag operation enables simultaneous operation of the first and third axes J11 and J13. Since the two axes can be simultaneously operated, the time taken for teaching can be further reduced.

At step S11 shown in FIG. 6, if the operation of the first button 171 is not detected (NO at step S11), the motion command generator 16 allows the process to proceed to step S12 to determine whether or not the second button 172 has been operated. When the second button 172 is detected to have been operated (YES at step S12), the motion command generator 16 allows the process to proceed to step S15 to perform a combination B process.

Figure 8:
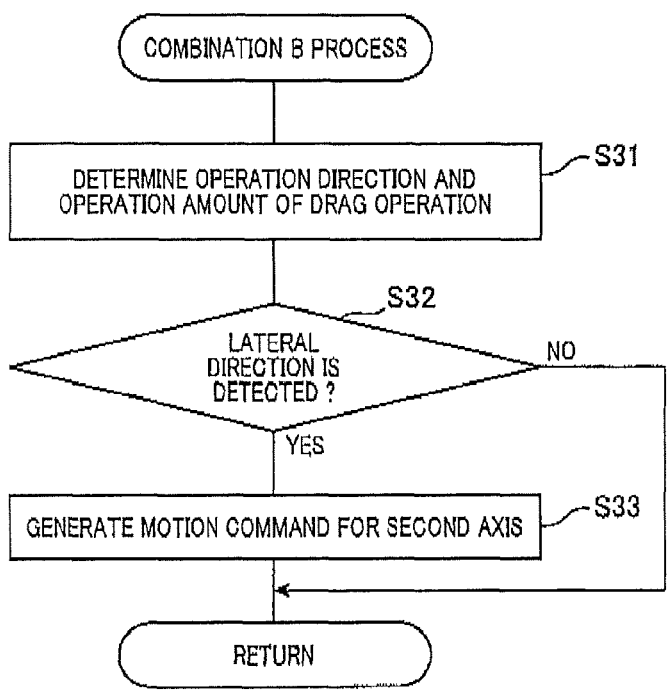
FIG. 8 is a flow diagram illustrating an example of a process for a combination B performed by the motion command generation section.

When a process shown in FIG. 8 is performed as the combination B process, the motion command generator 16 firstly determines, at step S31, an operation direction and an operation amount of the drag operation. Step S31 corresponds to the operation determination process. Then, at step S32, the motion command generator 16 determines whether or not the direction of the drag operation is a lateral direction (first direction) on the basis of the determination made at step S31. Then, if the direction of the drag operation is a lateral direction (first direction) (YES at step S32), the motion command generator 16 allows the process to proceed to step S33. At step S33, the motion command generator 16 generates a motion command for driving the second axis J12. After that, the combination B process is terminated (return). On the other hand, if the direction of the drag operation is not a lateral direction (first direction (NO at step S32), the motion command generator 16 terminates the combination B process (return). After that, the motion command generator 16 terminates the series of processing steps shown in FIG. 6. Steps S32 and S33 correspond to the first motion command generation process.

At step S12 shown in FIG. 6, if no operation of the second button 172 is detected (NO at step S12), control proceeds to step S13 where the motion command generator 16 determines whether or not the third button 173 has been operated. If the third button 173 is determined to have been operated (YES at step S13), the motion command generator 16 allows the process to proceed to step S16 to perform a combination C process.

Figure 9:
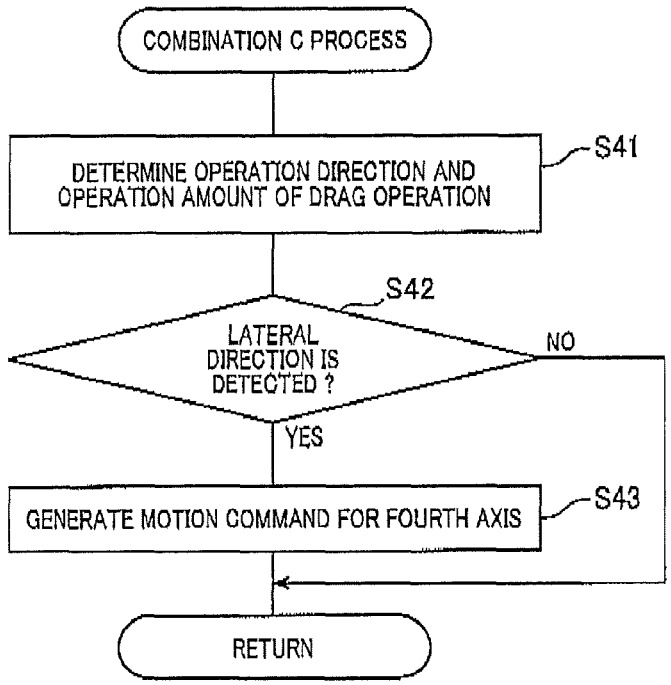
FIG. 9 is a flow diagram illustrating an example of a process for a combination C performed by the motion command generation section.

When a process shown in FIG. 9 is performed as the combination C process, the motion command generator 16 firstly determines, at step S41, an operation direction and operation amount of the drag operation. Step S41 corresponds to the operation determination process. Then, at step S42, the motion command generator 16 determines whether or not the direction of the drag operation is a lateral direction (first direction) on the basis of the determination made at step S41. Then, if the direction of the drag operation is a lateral direction (first direction) (YES at step S42), the motion command generator 16 allows the process to proceed to step S43 to generate a motion command for driving the fourth axis J14. After that, the combination C process is terminated (return).

On the other hand, if the direction of the drag operation is not a lateral direction (first direction) (NO at step S42), the motion command generator 16 terminates the combination C process (return). After that, the motion command generator 16 terminates the series of processing steps shown in FIG. 6. Steps S42 and S43 correspond to the first motion command generation process. Then, the motion command generated through the process described above is transmitted to the controller 3. Then, the controller 3 controls the motion of the robot 2 on the basis of the motion command.

According to the present embodiment, a user performs the selection operation, i.e. operates any one of the first, second and third buttons 171, 172 and 173, to select one combination among the combinations A to C of the driving axes. After selecting a combination of the driving axes through the selection operation, the user performs a drag operation in a lateral direction (first direction) or longitudinal direction (second direction). As a result, the user is able to drive the driving axis corresponding to the direction of the drag operation, among the selected combination of the driving axes. With this configuration, the teaching pendant 4 can receive two types of two-dimensional inputs in the touch panel 17 to distinguish and determine two or more types of operation inputs. Accordingly, the touch panel 17 can be used in the case where, for example, the teaching pendant 4 requires two or more operation inputs for a four-axis robot having four driving axes as an operation object.

According to the configuration, the user is able to differently use the drag operations in a lateral direction (first direction) and a longitudinal direction (second direction) to thereby drive a driving axis corresponding to the drag operation in a lateral direction (first direction) or a driving axis corresponding to the drag operation in a longitudinal direction (second direction). Thus, while using the touch panel 17, the teaching pendant 4 enables the user to intuitively perform an operation without the necessity of looking at the screen. As a result, manual operation of the robot 2 can be achieved by touch operation with the improved operability and without impairing safety. Further, the improved operability can contribute to reducing time taken for teaching.

In the above configuration, the first direction corresponds to the lateral direction on the touch panel 17, and the second direction corresponds to the longitudinal direction on the touch panel 17. The driving axes corresponding to the drag operation in the lateral direction (first direction) are the first, second and fourth axes J11, J12 and J14 which are used for moving the hand of the robot 2 in a horizontal direction relative to the motion reference plane P. The driving axis corresponding to the drag operation in the longitudinal direction (second direction) is the third axis J13 which is used for moving the hand of the robot 2 in a vertical direction relative to the motion reference plane P.

According to the configuration, in response to a lateral drag operation, the teaching pendant 4 drives a driving axis (first, second or fourth axis J11, J12 or J14) for a motion which the user can easily associate with the drag operation, or for a horizontal movement of the hand of the robot 2. Further, in response to a longitudinal drag operation, the teaching pendant 4 drives a driving axis (third axis J13) for a motion which the user can easily associate with the drag operation, or for a vertical movement of the hand of the robot 2.

As described above, according to the robot operation apparatus, a user can more intuitively perform operation. As a result, manual operation of the robot can be achieved by touch operation with more improved operability and without impairing safety. Further, the improved operability can contribute to reducing time taken for teaching.

According to the teaching pendant 4, the selection operation detector 18 detects an operation for the buttons 171 to 173 displayed on the display 12 of the touch panel 17, or an operation for a button different from the ones on the touch panel 17, although the details are not shown. According to this, a user can operate the buttons 171 to 173 displayed on the touch panel 17 to thereby select a combination of the driving axes as objects of operation. In this case, the user may look at the buttons 171 to 173 and the like for a little while to operate them.

However, in a mode of using a normal robot 2, the operation for selecting (switching) the driving axes as objects of operation is mostly performed before the robot 2 is driven, i.e. when the robot 2 is not yet in motion. By designing ideas in the settings such as of the shape, size and color of the buttons 171 to 173 and the like, the time for the user to look at the buttons 171 to 173 and the like can be shortened. Thus, if the user looks at the buttons 171 to 173 and the like displayed on the touch panel 17 for a little while to operate them, it is considered there is no concern for impairing safety.

In fact, with such a configuration, a user is permitted to have a purpose of operating the buttons to switch the combinations of the driving axes as objects of operation. Accordingly, the user can be easily conscious of the operation for the buttons 171 to 173 and the like being performed for selecting a combination of the driving axes as objects of operation. Thus, this configuration can reduce the risk of causing erroneous motion of the robot 2 with a selection of erroneous objects of operation by the user's erroneous operation. As a result, manual operation of the robot 2 can be achieved by touch operation with improved operability and without impairing safety. Further, the improved operability can contribute to reducing time taken for teaching.

In the foregoing embodiment, the motion command generator 16 can be configured so as to make a selection from the combinations A to C only when the selection operation detector 18 is detecting the touch operation for the buttons 171 to 173, but to make a selection of none of the combinations A to C when the selection operation detector 18 is not detecting the touch operation for the buttons 171 to 173. In this case, a user is able to perform a drag operation while touch-operating any one of the buttons 171 to 173, to drive a driving axis corresponding to a selected one of the combinations A to C. On the other hand, in a state where the user is not touch-operating any of the buttons 171 to 173, none of the driving axes can be driven. According to this configuration, the user has to touch-operate the buttons 171 to 173 every time he/she operates the robot and thus the user's intent to operate the robot is clarified. Thus, in the event that a drag operation is erroneously inputted to the teaching pendant against the user's intent, the robot 2 will not be operated in a state where none of the buttons 171 to 173 is operated, thereby improving safety.

It may be so configured that, when a touch operation for the buttons 171 to 173 has been detected by the selection operation detector 18, the control unit 14 stores the combination corresponding to the selected one of the buttons 171 to 173 to the storage region 142. In this case, for example, the storage region 142 regains the information regarding the selected combination while the teaching pendant 4 is turned on, or until the information is overwritten by new information. According to this configuration, a user no longer needs to operate the buttons 171 to 173 every time he/she operates the robot and thus operability is improved. As a result, the time taken for teaching can be further shortened.

The drag operation for the teaching pendant 4 is a so-called traversable drag operation using one finger. Accordingly, the teaching pendant 4 has an advantage of enabling easy input operation with one finger. This advantage is also effective in using a pointing device, such as a touch pen or a stylus pen. Specifically, in an environment where an industrial robot is operated, a user may put on gloves to ensure safety of the user, or a material, such as lubricant oil, hindering the touch operation may be attached to the user's fingers. In such a case, there is a probability that the users touch operation by a finger is not correctly recognized by the touch operation detector 15. On the other hand, use of the pointing device mentioned above enables a user to correctly perform touch operation under the condition where the user put on gloves, or lubricant oil or the like is attached to the user's fingers. For this reason, when the robot operation apparatus operates an industrial robot as an object of operation, facilitating use of a pointing device mentioned above is advantageous.

The touch operation detector 15 detects a touch operation for the touch panel 17 that is provided in the casing 11, as shown in FIG. 1, which can be handheld by the user. In such a configuration, a user holds the casing 11 by one hand, while performing operations using a finger of the other hand. In this case, there is a concern that the fingers of the hand holding the casing 11 inadvertently touch the touch panel 17. Due to the inadvertent touch, the robot may make a motion which is not desired by the user.

Figure 10A:
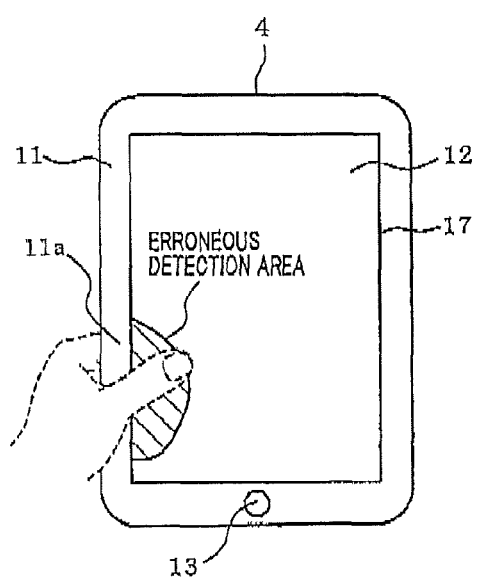
FIG. 10A is a diagram illustrating an example of an erroneous touch by a hand holding a case.

As shown in FIG. 10A, the teaching pendant 4 is provided with a handheld part 11a for a user to hold the casing 11. The touch operation detector 15 excludes a predetermined range of the touch panel 17 adjacent to the handheld part 11a, from a target of detection of a touch operation (hereinafter, this range is referred to as detection exclusion area). With this configuration, in the event that the hand (e.g., left hand) holding the casing 11 inadvertently touches the panel, the inadvertent touch will not be detected. Thus, this configuration can reliably prevent the robot from being erroneously operated by the user's inadvertent operation.

The inventors of the present invention conducted tests of performing drag operation using one finger of a hand, with the casing 11 being held by the other hand. In the tests, two types of devices were used as the teaching pendant 4, one being a device having a display 12 of about 7 inches, the other being a device having a display 12 of about 4 inches. As a result of analyzing the results, in the case of the device with the 7-inch display 12, the evaluators mostly held the casing 11 as shown in FIG. 10A. In other words, right-handed evaluators held a lower left portion (handheld part 11a) of the casing 11 by the left hand. Of the left-hand fingers, the thumb touched the surface (surface where the touch panel 17 is provided) of the casing 11. In this case, the thumb sometimes inadvertently touched the area adjacent to the handheld part 11a of the touch panel 17.

Figure 10B:
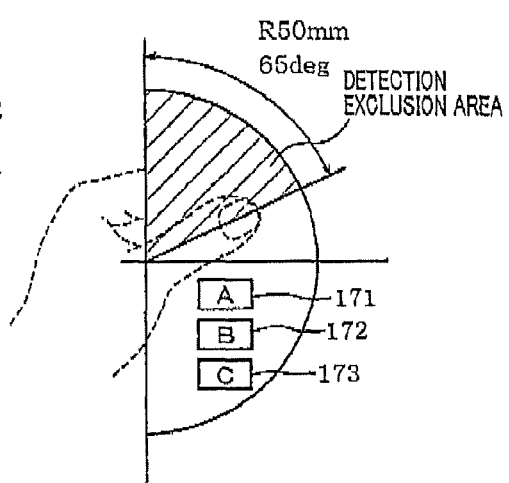
FIG. 10B is a diagram illustrating an example of a detection exclusion area for preventing the erroneous touch.

To cope with this, as shown in FIG. 10B, in the case of the 7-inch display 12, a detection exclusion area is set in the panel, where there is a high probability that the base of the user's thumb is located in holding the casing 11. The release area is set within a 50 mm radius centering on the position where the base of the thumb will be located. The reason why not more than the 50 mm radius is used is that an average length of the thumb of Japanese people is about 60 mm and that the finger pad of the thumb is considered to be in contact with the panel in the inadvertent touch. For left-handed users, a detection exclusion area is horizontally flipped side to side because left-handers have a high probability of contacting a portion that is reverse of the inadvertent touch portion of right-handers. As a result of further analysis, it was also found that the angle of the thumb (relative to a side face of the casing 11) when the evaluators hold the casing 11 was mostly about 65 degrees. Accordingly, the detection exclusion area described above may be in a fan shape of 65 degrees as hatched in FIG. 10B, instead of the semicircular shape of 50 mm radius.

According to the tests set forth above, in the case of the 4-inch display 12, the fingers of the hand holding the casing 11 did not touch the touch panel 17. This is considered to be because the casing 11 as a whole can fit comfortably in a hand. Accordingly, in the case of the 4-inch display 12, i.e. when the casing 11 can fit comfortably in a hand, it is considered that there is no need to provide a detection exclusion area. In contrast, in the case of the 7-inch display 12, i.e. when the casing 11 does not fit comfortably in a hand, a detection exclusion area is required to be set. Thus, whether a set detection exclusion area effectively works depends on the size of the casing 11. In other words, the detection exclusion area may be enabled or disable depending on the size of the casing 11.

In the robot system 1, an erroneous motion of the robot 2 is particularly a problem. Therefore, the occurrence of such an erroneous motion has to be reliably prevented. On the other hand, touch operation, as its nature, has a comparatively high probability of causing errors or the like. However, according to the present embodiment, the idea as mentioned above can reliably prevent the occurrence of an erroneous motion of the robot 2, while achieving manual operation of the robot 2 by touch operation.

The three buttons 171 to 173 serving as the selection operation section are arranged inside the predetermined range, i.e. the detection exclusion area, which is adjacent to the handheld part that is held by a user in holding the casing 11 by hand. In this case, the selection operation detector 18 is able to detect an operation for the button 171 to 173 arranged inside the detection exclusion area.

When a user holds the casing 11, the thumb of the hand holding the casing 11 is located on a front face of the casing 11, i.e. on a front face side of the touch panel 17. Therefore, within a movable range of the thumb of the hand holding the casing 11, the touch panel 17 can be operated by the thumb. In this case, on the touch panel, the user is able to move the thumb of the hand holding the casing 11, drawing an arc with the base of the thumb being used as a fulcrum. Accordingly, in a state where the casing 11 is held, the movable range of the thumb is inside an arc whose radius corresponds to the length of the thumb from the base thereof as a fulcrum.

Specifically, the predetermined range where the three buttons 171 to 173 are provided is ensured to reside, for example, in an area that is considered to be a movable range of the thumb of the hand holding the casing 11, i.e. an area inside the arc mentioned above, or, in short, the buttons are provided in the detection exclusion area. Accordingly, a user is able to operate the plurality of buttons 171 to 173 arranged within the predetermined range, without releasing the hand from the casing 11. Thus, the user is able to operate the touch panel 17 with both hands. As a result, the operability of the teaching pendant 4 is further improved. With the improvement in the operability, the time required for teaching can be further shortened.

The three buttons 171 to 173 are arranged in a longitudinal direction in the touch panel 17. Accordingly, in a state where a user holds the casing 11, the moving direction of the thumb of the hand holding the casing approximately coincides with the arrangement direction of the buttons 171 to 173, and thus easy operation can be ensured. The arrangement of the three buttons 171 to 173 is not limited to the one mentioned above. For example, the three buttons 171 to 173 may be arranged so as to form a peak of a triangle. Alternatively, if the number of driving axes as objects of operation is limited, the buttons may be reduced to two.

Further, instead of the buttons 171 to 173 displayed on the display 12, the target of detection for the selection operation detector 18 may be physical buttons provided separately from the touch panel 17. For example, the target detection for the selection operation detector 18 may be the key switch 13. In this case, the motion command generator 16 may be configured to sequentially switch selection of the combinations A to C every time an operation for the key switch 13 is detected. Alternatively, physical buttons corresponding to the respective combinations A to C may be provided in the casing 11.

In the present embodiment, the first direction is set in a lateral direction relative to the touch panel 17, while the second direction is set in a longitudinal direction relative to the touch panel 17. Not being limited to this, for example, the first and second directions may obliquely intersect with other on the touch panel 17.

Second Embodiment

Referring to FIG. 11, a second embodiment is described. It should be noted that in the second embodiment and the subsequent embodiments, the components identical with or similar to those in the first embodiment are given the same reference numerals for the sake of omitting unnecessary explanation.

The second embodiment is different from the first embodiment in the combinations of the driving axes. Specifically, in the first embodiment, the driving of the third axis J13 corresponds to a drag operation in a longitudinal direction (second direction) in the combination A. On the other hand, in the present embodiment, the driving of the third axis J13 corresponds to a drag operation in a longitudinal direction (second direction) of the combination C.

Specifically, in the present embodiment, the combination C is configured by an operation for the fourth axis J14 and an operation for the third axis J13. Of the driving axes J11, J12 and J14 associated with a horizontal movement of the hand of the robot 2, the fourth axis J14 is positioned nearest the hand of the robot 2. In other words, when the fourth axis J14 is driven, the amount of movement of the hand of the robot 2 is minimum, compared to other two axes J11 and J12. Further, when the third axis J13 for up-and-down movement is driven, the amount of movement of the hand of the robot 2 is small compared to the first and second axes J11 and J12. In other words, the amounts of movement of the fourth and third axes J14 and J13, when driven, are approximate.

When the axes, whose amounts of movement are approximate, are combined and subjected to simultaneous operation, the following advantages can be obtained. Specifically, in the first place, in simultaneously operating two axes, it is considered that the user may expect that the amounts of movement of the hand of the robot 2 are equal in the driving of these two axes. Accordingly, combining the axes imparting approximate amounts of movement to the hand of the robot 2 can meet the expectation of the user. Thus, the user is able to intuitively operate the robot, and the speed of teaching is enhanced by the simultaneous two-axis operation.

In the second place, selecting the combinations A and B, the user is able to impart a rough motion to the robot 2. Then, selecting the combination C the user can impart a precise motion (fine motion) to the robot 2. Thus, the user is able to switch a rough motion (coarse motion) with a fine motion and hence the operability of the teaching pendant 4 is improved. In the third place, if the user inadvertently inputs an oblique drag operation in a state of selecting the combination C, there is a concern that the fourth and third axes J14 and J13 are simultaneously driven. In the event of simultaneous driving of the fourth and third axes J14 and J13, the resultant motion of the robot 2 is not greatly different from the motion desired by the user because the amounts of movement of the robot 2 are approximate in the driving of the two driving axes J14 and J13. Thus, if the user inadvertently input an oblique drag operation, a motion that is greatly different from the user's expectation can be prevented. As a result, safety is further improved.

Third Embodiment

Figure 12:
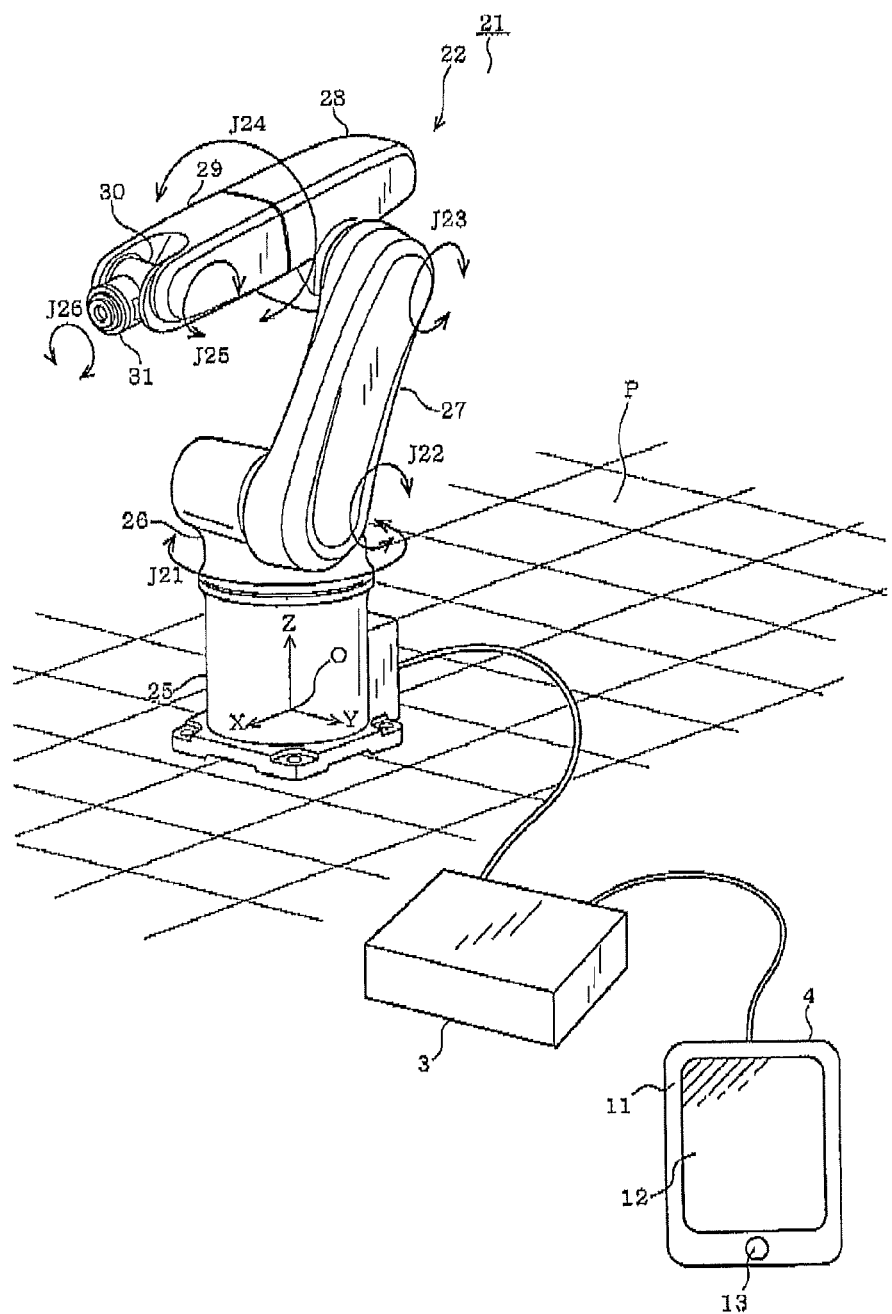
FIG. 12 is a diagram illustrating an example of a schematic configuration of a six-axis robot system, according to a third embodiment.

Referring to FIGS. 12 and 13, a third embodiment is described. The third embodiment is different from the foregoing embodiments in that the type of the robot as an object of operation has been changed. FIG. 12 shows a robot system 21 of the present embodiment. The robot system 21 includes a robot 22 in place of the robot 2 of the robot system 1 of the first embodiment shown in FIG. 1. For example, the robot 22 is configured as a six-axis vertical articulated robot. The robot system 21 includes a base 25 onto which a shoulder 26 is connected via a first axis J21 having an axis center in a Z-axis direction, so as to be rotatable in a horizontal direction. The shoulder 26 is connected a lower arm 27 via a second axis J22 having an axis center in a Y-axis direction. Specifically, the lower arm 27, which extends upward, has a lower end portion connected to the shoulder 26 so as to be rotatable in a vertical direction. The lower arm 27 has a tip portion to which a first upper arm 28 is connected via a third axis J23 having an axis center in a Y-axis direction, so as to be rotatable in a vertical direction. The first upper arm 28 has a tip portion to which a second upper arm 29 is twistingly rotatably connected via a fourth axis J24 having an axis center in an X-axis direction. The second upper arm 29 has a tip portion to which a wrist 30 is connected via a fifth axis J25 having an axis center in a Y-axis direction, so as to be rotatable in a vertical direction. To the wrist 30, a flange 31 is twistingly rotatably connected via a sixth axis J26 having an axis center in an X-axis direction.

The base 25, the shoulder 26, the lower arm 27, the first and second upper arms 28 and 29, the wrist 30 and the flange 31 have a function as an arm of the robot 22. The flange 31 (corresponding to a hand) serving as an arm tip is mounted with a tool, such as an air chuck, not shown. Similar to the robot 2 of the first embodiment, the plurality of axes (J21 to J26) of the robot 22 are driven by motors (not shown) respectively provided to the axes. In the vicinity of each motor, a position sensor (not shown) is provided to detect a rotational position of the corresponding rotary shaft. The six-axis vertical articulated robot 22 is provided with six driving axes.

Referring to FIG. 13, specific examples of combinations of the axes of the present embodiment are described. A combination of axes refers to a combination configured by one or two axes among the six driving axes J21 to J26. In the present embodiment as well, a first direction of a drag operation corresponds to a lateral direction, while a second direction corresponds to a longitudinal direction. In a combination A, a drag operation in a lateral direction (first direction) corresponds to the first axis J21, while a drag operation in a longitudinal direction (second direction) corresponds to the second axis J22.

When a lateral drag operation is detected in a state where the first button 171 is operated and the combination A is selected, the motion command generator 16 generates a motion command for driving the first axis J21. Further, when a longitudinal drag operation is detected in a state where the first button 171 is operated and the combination A is selected, the motion command generator 16 generates a motion command for driving the second axis J22. Thus, when a user performs a lateral drag operation in a state where the combination A is selected, the first axis J21 can be driven. When the user performs a longitudinal drag operation in this state, the second axis J22 can be driven.

In this case, when the user drag-operates the touch panel 17 rightward, the motion command generator 16 drives the first axis J21 in a positive (+) direction to move the hand of the robot 22 rightward. On the other hand, when the user drag-operates the touch panel 17 leftward, the motion command generator 16 drives the first axis J21 in a negative (−) direction to move the hand of the robot 22 leftward. When the user drag-operates the touch panel 17 upward, the motion command generator 16 drives the second axis J22 in a positive (+) direction to move the hand of the robot 22 upward, i.e. in a direction departing from the motion reference plane P. On the other hand, when the user drag-operates the touch panel 17 downward, the motion command generator 16 drives the second axis J22 in a negative (−) direction to move the hand of the robot 22 downward, i.e. in a direction nearing the motion reference plane P.

It is considered that a user can easily associate a lateral drag operation with the driving of the first axis J21 and can easily associate a longitudinal drag operation with the driving of the second axis J22. For example, the evidence that the driving of the first axis J21 is associated with the lateral drag operation is as follows. Specifically, in the six-axis vertical articulated robot 22, the first axis J21 is a rotation axis extending in a vertical direction. Accordingly, when the first axis J21 is driven, the hand of the robot 22 is moved in a horizontal direction centering on the first axis J21. In manually manipulating the robot 22, the user is apt to see the robot 2 from slightly above in a horizontal direction. In this case, for the user, the hand of the robot 22 appears to move in a horizontally lateral direction. Accordingly, the user's operation direction (lateral direction) coincides with the movement direction of the hand of the robot 22. Thus, the user can easily recognize that the movement motion of the hand, with the first axis J21 being driven, is correlated with the lateral operation for the touch panel 17. In this way, the user can easily recognize the movement direction of the hand of the robot 22 as being correlated to the direction of the own drag operation.

Further, for example, the evidence that the driving of the second axis J22 is associated with the longitudinal drag operation is as follows. Specifically, the second axis J22 is a rotation axis extending in a horizontal direction. In other words, the second axis J22 is a driving axis for moving the hand of the robot 22 in a vertical direction relative to the motion reference plane P, i.e. in an up-and-down direction relative to a gravitational direction. As shown in FIG. 5, in a state where the user 100 holds the teaching pendant 4 in a natural posture, the longitudinal direction, i.e. the up-and-down direction, of the teaching pendant 4 as indicated by the arrows A1 and A2 coincides with the vertical direction, i.e. the up-and-down direction, of the hand of the robot 22. Accordingly, the user can easily recognize the longitudinal operation on the screen of the touch panel 17 as being correlated to the vertical movement of the hand of the robot 22 with the second axis J22 being driven.

In a combination B, a drag operation in a lateral direction (first direction) corresponds to the fourth axis J24, while a drag operation in a longitudinal direction (second direction) corresponds to a third axis J23. Specifically, when a lateral drag operation is detected in a state where the second button 172 is operated and the combination B is selected, the motion command generator 16 generates a motion command for driving the fourth axis J24. Further, when a longitudinal drag operation is detected in a state where the second button 172 is operated and the combination B is selected, the motion command generator 16 generates a motion command for driving the third axis J23. Thus, when a user performs a lateral drag operation in a state where the combination B is selected, the fourth axis J24 can be driven. When the user performs a longitudinal drag operation in this state, the third axis J23 can be driven.

In this case, when the user drag-operates the touch panel 17 rightward, the motion command generator 16 drives the fourth axis J24 in a positive (+) direction to move the hand of the robot 22 rightward. When the user drag-operates the touch panel 17 leftward, the motion command generator 16 drives the fourth axis J24 in a negative (−) direction to move the hand of the robot 22 leftward. When the user drag-operates the touch panel 17 upward, the motion command generator 16 drives the third axis J23 in a positive (+) direction to move the hand of the robot 22 upward, i.e. in a direction departing from the motion reference plane P. On the other hand, when the user drag-operates the touch panel 17 downward, the motion command generator 16 drives the third axis J23 in a negative (−) direction to move the hand of the robot 22 downward, i.e. in a direction nearing the motion reference plane P.

It is considered that a user can easily associate a lateral drag operation with the driving of the fourth axis J24 and can easily associate a longitudinal drag operation with the driving of the third axis J23. For example, the evidence that the driving of the fourth axis J24 is associated with the lateral drag operation is as follows. Specifically, in the six-axis vertical articulated robot 22, the fourth axis J24 is a rotation axis provided to the tip portion of the first upper arm 28, i.e. a rotation axis extending in a direction that is the direction in which the first upper arm 28 extends. The fourth axis J24 extends in a direction more approximate to the horizontal direction in a basic posture with which the robot 22 is manually operated. Accordingly, when the fourth axis J24 is driven, the hand of the robot 22 is moved in a horizontal direction centering on the fourth axis 324.

In this case, for the user, the hand of the robot 22 appears to move in a horizontally lateral direction. Accordingly, the user's operation direction (lateral direction) coincides with the movement direction of the hand of the robot 22. Thus, the user can easily recognize that the lateral operation for the touch panel 17 is correlated to the movement motion of the hand, with the fourth axis J24 being driven. Therefore, the user can easily recognize that the movement direction of the hand of the robot 22 is correlated to the direction of the drag operation of the user. Further, the evidence that the longitudinal drag operation can be associated with the second axis J22 is similar to the case of the second axis J22 described above.

In a combination C, a drag operation in a lateral direction (first direction) corresponds to the sixth axis J26, while a drag operation in a longitudinal direction (second direction) corresponds to a fifth axis J25. Specifically, when a lateral drag operation is detected in a state where the third button 173 is operated and the combination C is selected, the motion command generator 16 generates a motion command for driving the sixth axis J26. Further, when a longitudinal drag operation is detected in a state where the third button 173 is operated and the combination C is selected, the motion command generator 16 generates a motion command for driving the fifth axis J25. Thus, when a user performs a lateral drag operation in a state where the combination C is selected, the sixth axis J26 can be driven. When the user performs a longitudinal drag operation in this state, the fifth axis J25 can be driven.

In this case, when the user drag-operates the touch panel 17 rightward, the motion command generator 16 drives the sixth axis J26 in a positive (+) direction to move the hand of the robot 22 rightward. On the other hand, when the user drag-operates the touch panel 17 leftward, the motion command generator 16 drives the sixth axis J26 in a negative (−) direction to move the hand of the robot 22 leftward. When the user drag-operates the touch panel 17 upward, the motion command generator 16 drives the fifth axis 325 in a positive (+) direction to move the hand of the robot 22 upward, i.e. in a direction departing from the motion reference plane P. On the other hand, when the user drag-operates the touch panel 17 downward, the motion command generator 16 drives the fifth axis J25 in a negative (−) direction to move the hand of the robot 22 downward, i.e. in a direction nearing the motion reference plane P.

It is considered that a user can easily associate a lateral drag operation with the driving of the sixth axis J26. For example, the evidence is as follows. Specifically, the sixth axis J26 is used for rotating the hand of the robot 22. When the hand of the robot 22 is seen from a horizontal direction, one point in the hand of the robot 22 appears to linearly move in a horizontal direction with the rotation of the hand of the robot 22. Accordingly, it is considered that the user can associate the rotating motion of the hand of the robot 22 with the lateral operation for the touch panel 17. Thus, the user can easily recognize the lateral operation for the touch panel 17 as being correlated to the rotating motion of the hand of the robot 22.

For example, the evidence that the longitudinal drag operation can be associated with the driving of the fifth axis J25 is as follows. Specifically, the fifth axis J25 is a rotation axis provided to the tip portion of the second upper arm 29, i.e. a rotation axis extending in a horizontal direction. In other words, the fifth axis J25 is a driving axis for moving the hand of the robot 22 in a vertical direction relative to the motion reference plane P, i.e. in an up-and-down direction relative to a gravitational direction. Accordingly, similar to the cases of the second and third axes J22 and J23 described above, the longitudinal direction (up-and-down direction) of the teaching pendant 4 in a state where the user holds the teaching pendant 4 coincides with the vertical direction (up-and-down direction) of the hand of the robot 22. Accordingly, the user can easily recognize the longitudinal operation on the screen of the touch panel 17 as being correlated to the vertical movement of the hand of the robot 22, with the fifth axis J25 being driven.

The motion command generator 16 performs control similar to the way described in the first embodiment referring to FIG. 6. In this case, the motion command generator 16 performs control in a manner similar to FIG. 7 in the processing steps for the combinations shown at steps S14 to S16 of FIG. 6. Specifically, in a combination A process of the present embodiment, the motion command generator 16 generates a motion command for the first axis J21 at step S23, and generates a motion command for the second axis J22 at step S25. Further, in a combination B process, the motion command generator 16 generates a motion command for the fourth axis J24 at step S23, and generates a motion command for the third axis J23 at step S25. Then, in a combination C process, the motion command generator 16 generates a motion command for the sixth axis J26 at step S23, and generates a motion command for the fifth axis J25 at step S25.

According to this configuration, the six-axis vertical articulated robot 22 can also obtain advantageous effects similar to those of the foregoing embodiments. In the present embodiment, the robot 22 as an object of operation has the base 25 set up on the work table P (set-up surface), the shoulder 26 provided so as to be rotatable relative to the base 25 by the first axis J21, the lower arm 27 provided so as to be rotatable relative to the shoulder 26 by the second axis J22, the first upper arm 28 provided so as to be rotatable relative to the lower arm 27 by the third axis J23, the second upper arm 29 provided so as to be rotatable relative to the first upper arm 28 by the fourth axis J24, the wrist 30 provided so as to be rotatable relative to the second upper arm 29 by the fifth axis J25, and the flange 31 provided so as to be rotatable relative to the wrist 30 by the sixth axis J26.

Combinations of the driving axes include at least any one of the combination A configured by the first axis J21 corresponding to a drag operation in a lateral direction (first direction) and the second axis J22 corresponding to a drag operation in a longitudinal direction (second direction), the combination B configured by the fourth axis J24 corresponding to a drag operation in a lateral direction (first direction) and the third axis J23 corresponding to a drag operation in a longitudinal direction (second direction), and the combination C configured by the sixth axis J26 corresponding to a drag operation in a lateral direction (first direction) and the fifth axis J25 corresponding to a drag operation in a longitudinal direction (second direction).

The first and second axes J21 and J22 configuring the combination A have amounts of movement, when driven, approximate to each other for the hand of the robot 22. The fourth and third axes J24 and J23 configuring the combination B have amounts of movement, when driven, approximate to each other for the hand of the robot 22. The sixth and fifth axes J26 and J25 configuring the combination C have amounts of movement, when driven, approximate to each other for the hand of the robot 22. Each of the combinations A to C is configured by the driving axes whose amounts of movement, when driven, approximate to each other. Accordingly, a user is able to select a combination of the driving axes according to the extent of movement of the hand of the robot 22, thereby improving operability. As described in the second embodiment, in the event that the user inadvertently inputs a drag operation in an oblique direction, the robot's motion greatly against the user's expectation can be avoided. As a result, safety can be further improved.

Fourth Embodiment

Figure 14:
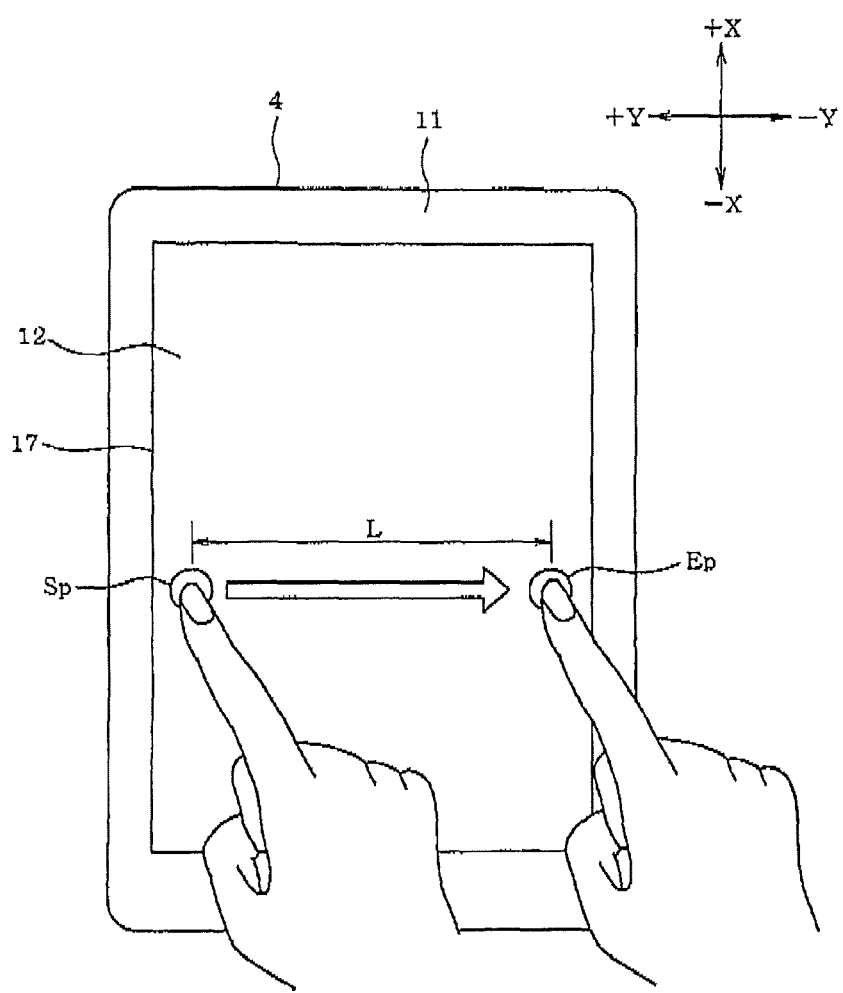
FIG. 14 is a diagram illustrating an example of a drag operation inputted to a touch panel, according to a fourth embodiment.
Figure 15:
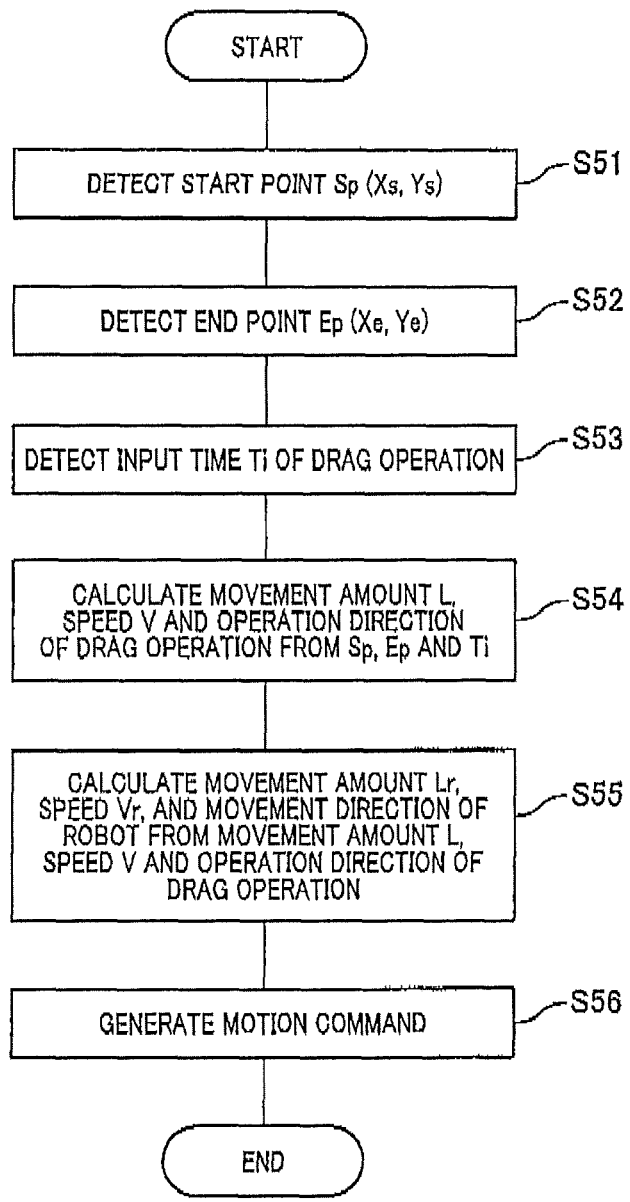
FIG. 15 is a flow diagram illustrating an example of various processing steps performed by a control unit, according to the fourth embodiment.

Referring to FIGS. 14 and 15, a fourth embodiment is described. The present embodiment relates to determination on a movement speed and an amount of movement of the robot 2 or 22 when a drag operation is performed as a so-called gesture operation (operation by combining an operation direction and an amount of movement of a finger). In the present embodiment, the motion command generator 16 is able to perform an operation determination process, a speed calculation process, and a motion command generation process. In the operation determination process, when a touch operation detected by the touch operation detector 15 is a drag operation, the motion command generator 16 determines an amount of movement of a finger in the drag operation. In the speed calculation process, the motion command generator 16 calculates a movement speed of the robot 2 or 22 on the basis of the amount of movement of a finger determined in the operation determination process. In the motion command generation process, the motion command generator 16 generates a motion command for moving the robot 2 or 22 at a movement speed calculated in the speed calculation process.

The motion command generator 16 is able to perform the movement amount calculation process for calculating a distance of movement of the robot 2 or 22 on the basis of an amount of movement of a finger in a drag operation. For example, as shown in FIG. 14, a start point of a drag operation is indicated by a point Sp, and an end point of the drag operation is indicated by a point Ep. The end of a drag operation is when a user's finger has departed from the touch panel 17. In this case, the amount of movement of finger in a drag operation is a distance L from the start point Sp to the end point Ep. Based on the movement distance L of a drag operation, the control unit 14 calculates a movement distance Lr of the robot 2 or 22. Further, the control unit 14 calculates an average speed Vr of the robot 2 or 22 on the basis of a value obtained by dividing the movement distance L by an input time of a drag operation, i.e. an average speed V related to a movement of finger in a drag operation.

To realize the above configuration, the control unit 14 performs the control shown in FIG. 15. In the following description, the processes performed by the control unit 14 include processes performed by the touch operation detector 15 and the motion command generator 16. The X-Y coordinate system on the touch panel 17 shown in FIG. 14 does not have to necessarily coincide with the coordinate system of the robot 2 or 22.

When a drag operation has been detected and the control shown in FIG. 15 is started, the control unit 14 detects, at steps S51 and S52, a start point Sp (Xs, Ys) and an end point Ep (Xe, Ye). Then, at step S53, the control unit 14 detects a time taken for the drag operation, i.e. an input time Ti of the drag operation. Then, the control unit calculates a movement amount L of finger in the drag operation, an average speed V of finger in the drag operation, and an operation direction of the drag operation, from the start point Sp (Xs, Ys) and the end point Ep (Ex, Ys). Step S54 includes the operation determination process.

After that, at step S55, the control unit 14 calculates a movement amount Lr, an average speed Vr and a movement direction on the basis of the movement amount L of the drag operation, the average speed V and the operation direction calculated at step S54. Step S55 includes the speed calculation process. Then, at step S56, the control unit 14 generates a motion command on the basis of the movement amount Lr, the average speed Vr and the movement direction (motion command generation process). Then, the motion command is transmitted to the controller 3, and the controller 3 controls the motion of the robot 2 or 22 on the basis of the motion command. In this way, the control unit 14 terminates the series of processing steps.

In the present embodiment, the control unit 14 is able to perform the speed calculation process for calculating a movement speed Vr of the robot 2 or 22 on the basis of a movement amount L of finger in a drag operation. According to this configuration, the movement amount L of finger in a drag operation is correlated to the movement speed Vr of the robot 2 or 22. Accordingly, a user is able to adjust the movement speed Vr of the robot by adjusting the movement amount L of finger in a drag operation. Therefore, the user is able to intuitively perform operation to thereby improve operability. As a result, safety is improved, while time taken for teaching is shortened.

The control unit 14 is able to perform the movement amount calculation process for calculating a movement distance Lr of the robot 2 or 22 on the basis of a movement amount L of finger in a drag operation. According to this configuration, a user is able to adjust the movement amount Lr, i.e. the movement distance Lr, of the robot 2 or 22 by adjusting the movement amount of finger in a drag operation. In the speed calculation process, a movement speed Vr of the robot 2 or 22 is determined on the basis of a value obtained by dividing the movement amount L of finger in a drag operation by time taken for inputting the drag operation. According to this configuration, a user is able to adjust the movement speed Vr of the robot 2 or 22 by adjusting time taken for inputting a drag operation.

Accordingly, in inputting a drag operation, a user is able to adjust both of the movement speed Vr and the movement amount Lr of the robot 2 or 22 by adjusting the movement amount L and the input time Ti of the drag operation. In other words, the user is able to adjust both the movement speed Vr and the movement amount Lr of the robot 2 or 22 by one drag operation. Thus, the user is able to intuitively perform operation. Further, in determining a movement speed Vr and a movement amount Lr of the robot 2 or 22, a user does not have to do a plurality of operations which are, for example, an operation for determining a movement speed Vr of the robot 2 or 22, and an operation for determining a movement amount Lr of the robot 2 or 22. Accordingly, operation is simplified and operability is improved. Resultantly, safety is improved, while time required for teaching is reduced.

In FIG. 14, the circles at the start point Sp and the end point Ep and the white arrow in the display 12 are indicated for the sake of convenience in describing the motion of a drag operation, and are not indicated on the display 12 in an actual operation. However, with a drag operation, the teaching pendant 4 may indicate the start point Sp, the end point Ep and the white arrow on the display 12. This configuration is useful for a user in confirming the operation performed by the user.

Fifth Embodiment

Figure 16:
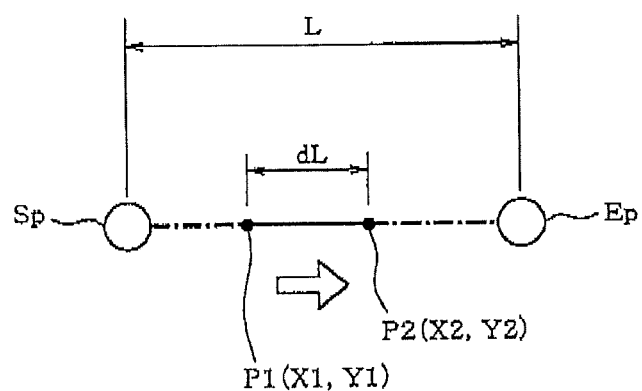
FIG. 16 is a diagram illustrating a finger movement in a period in a drag operation inputted to a touch panel, according to a fifth embodiment.
Figure 17:
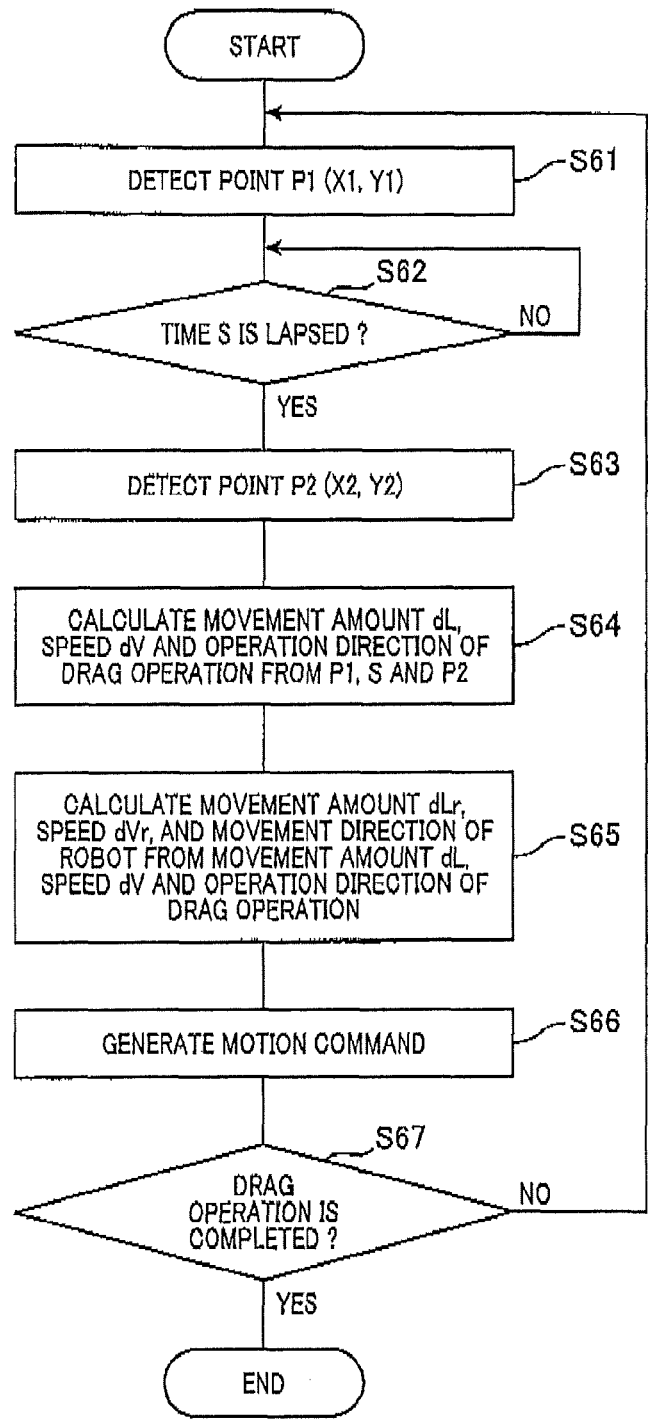
FIG. 17 is a flow diagram illustrating an example of various processing steps performed by a control unit, according to the fifth embodiment.

Referring to FIGS. 16 and 17, a fifth embodiment is described. The present embodiment provides a configuration for reflecting an input operation in a motion of the robot 2 or 22 on substantially a real-time basis. Specifically, in the fourth embodiment described above, the robot 2 or 22 is put in motion after completion of a drag operation input. Therefore, the motion is imparted to the robot 2 or 22 after completing the drag operation. Accordingly, there is a time-lag between the user's input of the drag operation and the actual motion of the robot 2 or 22. On the other hand, in the present embodiment, the control unit 14 appropriately generates a motion command for the robot 2 or 22 before completion of a drag operation. Accordingly, the actual motion of the robot 2 or 22 is taken up in substantially real-time with the user's input of the drag operation.

Specifically, the control unit 14 is able to perform the operation determination process, the speed calculation process, and the motion command generation process at a predetermined cycle S while a drag operation is performed. The expression "while a drag operation is performed" refers to a period from when a drag operation is started upon contact of the user's finger on the touch panel 17, until when the user's finger departs from the touch panel 17. In this case, as shown in FIG. 16, the period when a drag operation is performed corresponds to a period when a drag operation is inputted over a distance L between a start point Sp and an end point Ep of the drag operation.

To realize the above configuration, the control unit 14 performs the process shown in FIG. 17. In the following description, the processes performed by the control unit 14 include the processes performed by the touch operation detector 15 and the motion command generator 16. While an input of a drag operation is being detected, the control unit 14 performs the process shown in FIG. 17. Once the control shown in FIG. 17 is started, the control unit 14 detects, at step S61, a point P1 (X1, Y1) where a finger is currently located in a drag operation. Then, at step S62, the control unit 14 waits until a predetermined time S is lapsed (NO at step S62). After lapse of the time S (YES at step S62), control proceeds to step S63 where the control unit 14 detects a point P2 (X2, Y2) where the finger is currently located in the drag operation.

Then, at step S64, the control unit 14 calculates an operation direction of the drag operation, and a movement amount dL and a movement speed dV per predetermined time S, on the basis of the points P1 and P2, and the time S. Step S64 includes the operation determination process. Then, at step S65, the control unit calculates a movement direction of the robot 2 or 22 and a movement amount dLr and a movement speed dVr per predetermined time S, on the basis of the movement amount dL, the movement speed dV and the operation in the drag operation calculated at step S64. Step S64 includes the speed calculation process.

Then, at step S66, the control unit 14 generates a motion command on the basis of the movement amount dLr and the movement speed dVr per predetermined time S, and the movement direction (motion command generation process). Then, the motion command is transmitted to the controller 3, and the controller 3 controls the motion of the robot 2 or 22 on the basis of the motion command. After that, at step S67, the control unit determines whether or not the input of the drag operation has been completed. If it is determined that the input of the drag operation has not been completed (NO at step S61), control proceeds to step S61, where the control unit 14 repeats steps S61 to S67. On the other hand, if it is determined that the input of the drag operation has been completed (YES at step S61), the control units 14 terminates the series of processing steps. In this way, while the drag operation is being performed, the control unit 14 repeats the operation determination process, the speed calculation process, and the motion command generation process in every predetermined time S, i.e. at a predetermined cycle S.

According to the present embodiment, the control unit 14 is able to generate a motion command without waiting for the completion of a user's drag operation. Accordingly, the motion command generator 16 is able to generate a motion command for putting the robot 2 or 22 in motion in substantially real-time with a user's drag operation. Thus, the time-lag between the input of a user's drag operation and an actual motion of the robot 2 or 22 can be minimized. Accordingly, a user can more intuitively perform operation. As a result, safety is improved and time required for teaching can be reduced.

Sixth Embodiment

Figure 18:
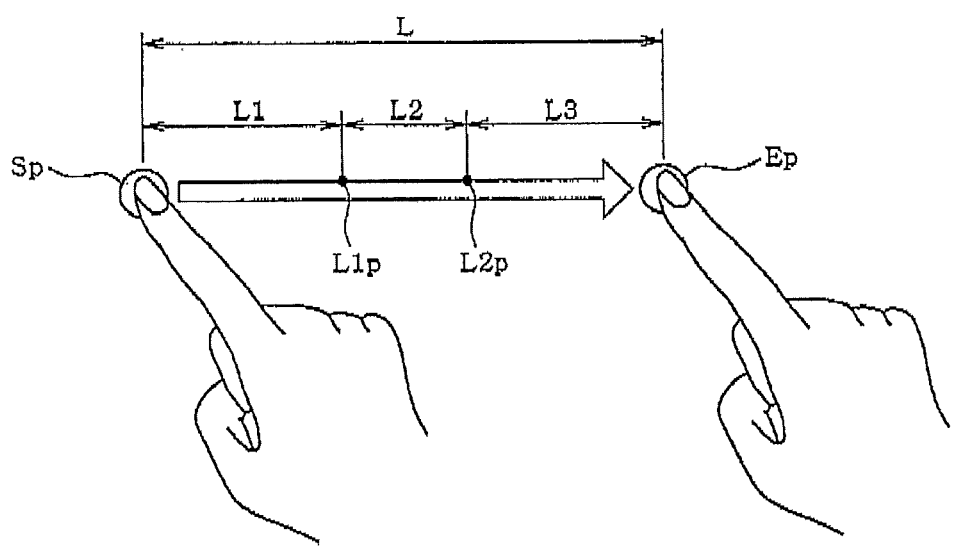
FIG. 18 is a diagram illustrating an amount of movement of finger in a drag operation inputted to a touch panel, according to a sixth embodiment.

Referring to FIGS. 18 to 20, a sixth embodiment is described. The present embodiment relates to a magnification (multiplying factor) between an operation amount of a drag operation and a movement amount of the robot 2 or 22 when the drag operation is performed as a so-called gesture operation. In FIG. 18, a sign L represents an operation amount of a drag operation from a start point Sp to an end point Ep of the drag operation.

In order for the robot 2 or 22 to perform a precise operation with an inputted operation amount or more of a drag operation, the teaching pendant 4 is considered to set a magnification between an operation amount of a drag operation and a movement amount of the robot 2 or 22. This magnification is expressed by a ratio of a movement amount of the robot 2 or 22 to an operation amount of a drag operation. For example, in the case where the magnification is set to 0.1, if a user performs a drag operation with an operation amount of 1 mm, the robot 2 or 22 can move by a movement amount of 0.1 mm. If a magnification is simply set to a constant value, the following problem may occur. There is a case where a coarse motion in the order of several mm to several tens of mm is required while a fine motion in the order of 0.1 mm is performed. In this case, when the magnification is set to 0.1, a drag operation with an operation amount of 200 mm (i.e., equivalent to a length of long side of a screen of 10 inches) allows the robot 2 or 22 to move by a movement amount of only 20 mm. For example, in order for the robot to move by a movement amount of 1000 mm, the user needs to repeat the drag operation with an operation amount of 200 mm 50 times. As a result, operability may be reduced due to such a complicated operation.

In the present embodiment, the move command generator 16 performs an operation determination process and a movement amount determination process. The operation determination process is a process to determine a movement amount of a finger in a drag operation detected by the touch operation detector 15. As shown in FIG. 18, the movement amount determination process determines a movement amount of the robot 2 or 22: i) by setting a magnification to a first magnification from when the drag operation starts at a start point Sp for operation until when the drag operation passes a first section L1; and ii) by setting a magnification to a value larger than the first magnification after the drag operation passes the first section L1. The magnification is used to determine a movement amount of the robot 2 or 22 by magnifying or reducing a movement of a finger in a drag operation determined by the operation determination process. The first magnification is set to a constant value smaller than 1.

In the present embodiment, the movement amount determination process is further configured to determine a movement amount of the robot 2 or 22: by setting a magnification to the second magnification from when the drag operation passes the first section L1 until when the drag operation passes a second section L2; and by setting a magnification to a third magnification being a constant value after the drag operation passes the second section L2. The second magnification is set to a value that continuously increases within a range from the first magnification to the third magnification in accordance with a movement amount of a finger in a drag operation.

Figure 19A:
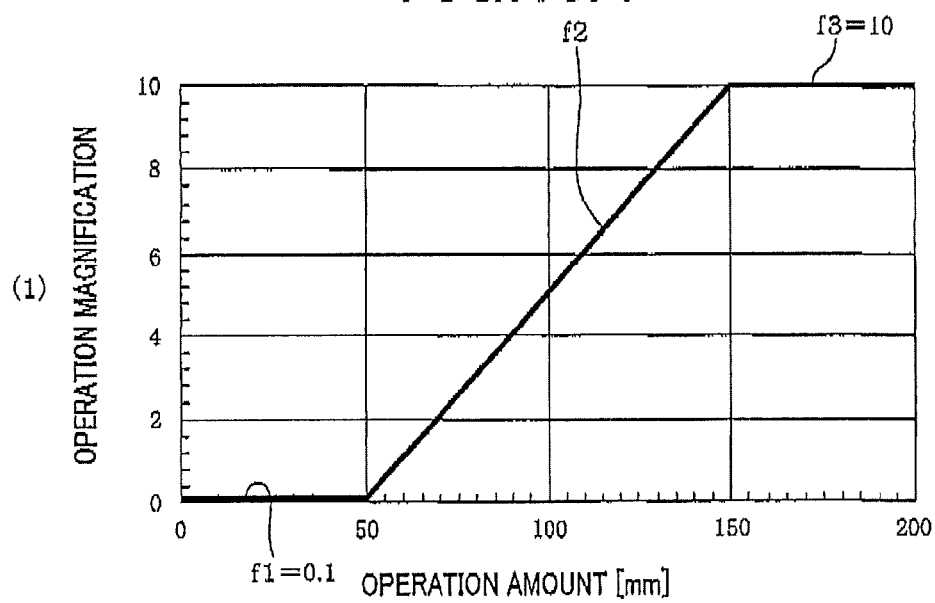
FIG. 19A is a diagram illustrating a relationship between a movement amount of a finger and an operation magnification in a drag operation, according to the sixth embodiment.
Figure 19B:
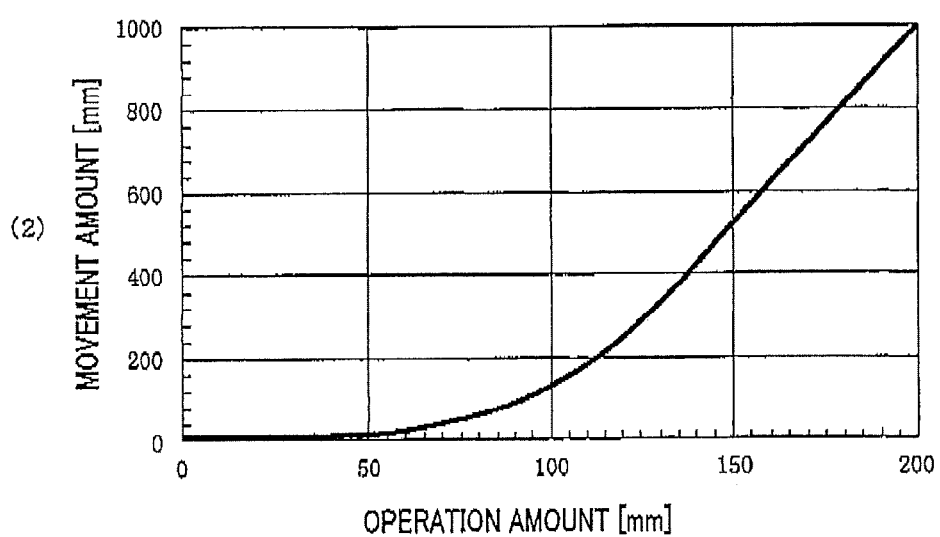
FIG. 19B is a diagram illustrating a relationship between a movement amount of a finger and a movement amount of a robot in a drag operation, according to the sixth embodiment.

Specifically, as shown in FIG. 18, the first section L1 is a section having a predetermined length (for example, 50 mm) from the start point Sp of the drag operation. In this case, as shown in FIGS. 19A and 19B, the first section L1 is a section (interval) from the operation amount of 0 mm (the start point Sp) to the operation amount of 50 mm (an end point L1$p$ of the first section L1). The length of the first section L1 is constant irrespective of the operation amount L of the drag operation. The magnification in the drag operation within the first section L1 is set to a first magnification f1. The first magnification f1 is a constant value smaller than 1, for example, 0.1 (f1=0.1) as shown in FIG. 19A.

The second section L2 is a section (interval) having a predetermined length (for example, 100 mm) from the end point L1$p$ of the first section L1. In this case, as shown in FIGS. 19A and 19B, the second section L2 is a section from the operation amount of 50 mm (the end point L1$p$ of the first section L1) to the operation amount of 150 mm (an end point L2$p$ of the second section L2). The length of the second section L2 is constant irrespective of the operation amount L of the drag operation. The magnification in the drag operation within the second section L2 is set to a second magnification f2. The second magnification f2 is a constant value that is larger than the first magnification f1 and smaller than a third magnification f3. In other words, the second magnification f2 is a variation value that continuously increases within a range from the first magnification f1 to the third magnification 13 in accordance with a movement amount of a finger in a drag operation, i.e., a distance L from the start point Sp.

The second magnification f2 is expressed by the following formula 1.

$$f2 = 0.099 \times (L - 50) + 0.1 \qquad \text{(formula 1)}$$

In the present embodiment, the second magnification 12 proportionally increases within a range from the first magnification f1 to the third magnification f3, but is not limited to it. For example, the second magnification f2 may increase according to a quadratic function or increase exponentially, within a range from the first magnification f1 to the third magnification f3.

The third section L3 is a section (interval) after the end point L2p of the second section. Specifically, the second section L3 is a section after an operation amount of 150 mm (the end point L2p of the second section). The length of the third section L3 changes depending on the operation amount of the drag operation. Specifically, the length of the third section L3 is a value obtained by subtracting the length of the first section L1 and the length of the second section L2 from the operation amount L of the drag operation. The magnification in the drag operation within the second section L3 is set to a third magnification f3. The third magnification f3 is a constant value that is larger than the first magnification f1 and larger than the second magnification f2. For example, as shown in FIG. 19A, the third magnification f3 is set to 10 (f3=10) that is larger than 1.

In the drag operation within the first section L1, the motion command generator 16 sets a movement amount of the robot 2 or 22 to a value obtained by multiplying the operation amount L of the drag operation by the first magnification f1. In the drag operation within the second section L2, the motion command generator 16 sets a movement amount of the robot 2 or 22 to a value obtained by multiplying the operation amount L of the drag operation by the second magnification f2. In the drag operation within the third section L3, the motion command generator 16 sets a movement amount of the robot 2 or 22 to a value obtained by multiplying the operation amount L of the drag operation by the third magnification D. In order to perform a fine motion of the robot 2 or 22 in the order of, e.g., 0.1 mm, the user repeats the drag operation within a range of the first section L1. In order to perform a coarse motion of the robot 2 or 22, the user continues to perform the drag operation thorough the first section L1 and the second section L2 to the third section L3.

FIG. 19B shows a variation of the movement amount of the robot 2 or 22 to the operation amount L of the drag operation. For example, if the operation amount L of the drag operation is 200 mm, the movement amount of the robot 2 or 22 becomes: i) 0.1×50=5 mm for operation within the first section L1; ii) ((10−0.1)×100/2)+(0.1×100)=505 mm for operation within the second section L2; and iii) 10×50=500 mm for operation within the third section L3. In other words, the movement amount of the robot 2 or 22 becomes 1010 mm for all sections of the first section L1, the second section L2 and the third section L3. Accordingly, when the drag operation is performed by the user with the operation amount of 200 mm, the robot 2 or 22 can move by the movement amount of 1010 mm.

This movement amount of the robot 2 or 22 changes within the respective sections as follows. First, the movement amount of the robot 2 or 22 increases according to a linear function for operation within the first section L1 (section from the operation amount of 0 mm to the operation amount of 50 mm) Second, the movement amount of the robot 2 or 22 increases according to a quadratic function for operation within the second section L2 (section from the operation amount of 50 mm to the operation amount of 150 mm) Finally, the movement amount of the robot 2 or 22 increases according to a linear function for operation within the third section L3 (section of the operation amount of 150 mm or more).

According to this configuration, when the drag operation of the user is performed within the first section L1, the robot 2 or 22 can move with the first magnification f1 that is a magnification using a constant value smaller than 1. In other words, the robot 2 or 22 can perform a fine motion by repeating the drag operation of the user within the first section L1. When the drag operation is performed by the user so as to exceed the first section L1, the robot 2 or 22 can move with the magnification larger than the first magnification f1 in a part exceeding the first section L1. In other words, the robot 2 or 22 can perform a coarse motion by performing the drag operation of the user so as to exceed the first section L1.

In this way, the user is able to move the robot 2 or 22 with different magnifications by one drag operation. Thus, both the fine and coarse motions of the robot 2 or 22 can be achieved by one drag operation. As a result, the user can realize both the fine and coarse motions of the robot 2 or 22 without a special operation to switch between the fine and coarse motions of the robot 2 or 22. Accordingly, operation is simplified and operability is improved. Resultantly, safety is improved, while time required for teaching is reduced.

According to the present embodiment, in the movement amount determination process, the movement amount of the robot 2 or 22 is determined by: i) setting the magnification to the second magnification f2 from when the finger of the user in the drag operation moves to pass the first section L1 until when the finger passes the second section L2; and ii) setting the magnification to the third magnification f3 of a constant value after the finger of the user in the drag operation passes the second section L2. In other words, the robot 2 or 22 can perform fine motion with the first magnification f1 smaller than 1, by repeating the drag operation of the user within the first section L1. The robot 2 or 22 can perform coarse motion with the second magnification f2 or the third magnification f3 that is larger than the first magnification f1, by performing the drag operation of the user so as to exceed the first section L1.

The second magnification f2 is a value that continuously increases within a range from the first magnification f1 to the third magnification f3 in accordance with the movement amount L of the finger in the drag operation. According to this, the second magnification f2, which is a magnification between a fine motion using the first magnification f1 and a coarse motion using the third magnification f3, continuously increases within a range from the first magnification f1 to the third magnification f3 in accordance with the movement amount L of the finger in the drag operation. In other words, the second magnification f2, which continuously increases, connects between the first magnification f1 of a constant value and the third magnification f3 of a constant value. Thus, the magnification, which is used for determining the movement amount of the robot 2 or 22 with respect to the operation amount of the finger in the drag operation, changes from the first magnification f1 via the second magnification, which gradually changes, to the third magnification f3. Accordingly, the magnification for determining the movement amount of the robot 2 or 22 can be prevented from changing rapidly from the first magnification f1 to the third magnification f3. In other words, the movement of the robot 2 or 22 can be prevented from changing rapidly from the fine motion from the coarse motion. This can reduce a sudden speed change of the robot 2 or 22 caused by a sudden change of the magnification unintended by a user. As a result, safety can be more improved.

As shown in FIGS. 20A and 20B, when the first magnification f1 is set to 0.01 and the third magnification f3 is set to 0.01, the second magnification 1'2 may be a value expressed by by the following formula 2, within a range from f1=0.01 to f3=1.0.

$$f2=0.099\times(L-50)+0.01 \quad \text{(formula 2)}$$

According to this, both the magnifications of 0.01 and 0.1 can be used, and therefore, a more fine motion of the robot 2 or 22 can be easily performed.

Other Embodiments

The present disclosure is not limited to the embodiments as described above and shown in figures. For instance, the present disclosure may be modified or expanded as follows.

In performing a manual operation of the robot, a plurality of motions may be performed to be simultaneously combined with each other. In order to cope with such a case, operations to perform the respective motions may not be divided clearly from each other. For instance, in this case, it is preferable not to use such a scheme that divides operations to perform the respective motions from each other in the above-described embodiments.

In some above-described embodiments, the robot operation of the present disclosure is applied to a configuration using the teaching pendant 4 dedicated to the robot system, but is not limited to it. For instance, functions equivalent to the above-describe functions can be also achieved by installing a dedicated application software (equivalent to a robot operation program) into a general purpose tablet terminal (e.g., a tablet PC) or a smartphone (e.g., a multifunction mobile phone).

The articulated robot is not limited to the four-axis horizontal articulated robot 2 or the six-axis articulated robot 22 in the above-described embodiments. For instance, an orthogonal robot having a plurality of driving axes may be used as the articulated robot. In this case, the driving axis is not limited to a mechanical rotation axis. For instance, the driving axis may include a system driven by a linear motor.

The robot operation apparatus of the above-described embodiments is used in operating the four-axis horizontal articulated robot 2 or the six-axis articulated robot 22, but is not limited to this. For instance, the robot operation apparatus may be used in manually operating various robots.

What is claimed is:

1. A robot operation apparatus comprising:
a touch panel that receives a touch operation inputted from a user;
a casing in which the touch panel is disposed, the casing being able to be held by a hand of the user;
a touch operation detector that detects the touch operation in a planar direction of the touch panel inputted from the user;
a motion command generator that generates a motion command to operate an articulated robot having a plurality of driving axes based on a detection result of the touch operation detector; and
a selection operation detector that is integrally or separately provided with the touch panel and detects a selection operation in the touch panel inputted from the user,
the motion command generator being configured to perform:
a selection process of:
selecting, based on the detection result of the touch operation detector, one of combinations of the driving axes as an operation object from among preset combinations of the driving axes including at least one of: i) a first driving axis of the robot associated with a drag operation in a first direction on the touch panel; or ii) a second driving axis of the robot associated with a drag operation in a second direction intersecting with the first direction, the first direction being a lateral direction in the touch panel and the second direction being a longitudinal direction in the touch panel, the first driving axis of the robot associated with the drag operation in the first direction being a driving axis that moves a hand of the robot in a horizontal direction with respect to a motion reference plane of the robot, and the second driving axis of the robot associated with the drag operation in the second direction being a driving axis that moves the hand of the robot in a vertical direction with respect to the motion reference plane of the robot; and
detecting an operation of a plurality of buttons displayed on the touch panel or a button different from one of the plurality of buttons displayed on the touch panel, the plurality of buttons being arranged inside a predetermined range which is adjacent to a handheld part that is held by the user in holding the casing by hand;
an operation determination process determining whether a direction of the drag operation is the first direction or the second direction, in response to the touch operation detected by the touch operation detector being the drag operation;
a first motion command generation process generating, in response to the direction of the drag operation being the first direction, a first motion command driving the first driving axis of the robot associated with the drag operation in the first direction among the combinations of driving axes selected in selection process; and
a second motion command generation process generating, in response to the direction of the drag operation being the second direction, a second motion command driving the second driving axis of the robot associated with the drag operation in the second direction among the combinations of driving axes selected in selection process;
the robot including:
a base that is disposed on a set-up surface;
a shoulder that is disposed so as to be rotatable relative to the base by a first axis;
a lower arm that is disposed so as to be rotatable relative to the shoulder by a second axis;
a first upper arm that is disposed so as to be rotatable relative to the lower arm by a third axis;
a second upper arm that is disposed so as to be rotatable relative to the first upper arm by a fourth axis;
a wrist that is disposed so as to be rotatable relative to the second upper arm by a fifth axis; and
a flange that is disposed so as to be rotatable relative to the wrist by a sixth axis; and
the combinations of driving axes including at least one of:
a first combination of the driving axes configured by: the first axis associated with the drag operation in the first direction, and the second axis associated with the drag operation in the second direction;
a second combination of the driving axes configured by: the fourth axis associated with the drag operation in the first direction, and the third axis associated with the drag operation in the second direction; or
a third combination of the driving axes configured by: the sixth axis associated with the drag operation in the first direction, and the fifth axis associated with the drag operation in the second direction.

2. The robot operation apparatus according to claim 1, wherein:
the operation determination process includes a process determining a movement amount of a finger of the user in the drag operation, in response to the touch operation detected by the touch operation detector being the drag operation; and
the motion command generator is configured to perform a speed calculation process calculating a movement speed of the robot, based on the movement amount of the finger.

3. The robot operation apparatus according to claim 2, wherein:
the motion command generator is configured to perform a movement amount calculation process calculating a movement amount of the robot, based on the movement amount of the finger; and
the speed calculation process determining the movement speed of the robot, based on a value obtained by dividing the movement amount of the finger by time taken to input the drag operation.

4. The robot operation apparatus according to claim 3, wherein:
the operation determination process includes a process determining the movement amount of the finger in the drag operation detected by the touch operation detector; and
the motion command generator is configured to perform a movement amount determination process determining the movement amount of the robot by setting a magnification for determining a movement amount of the robot by magnifying or reducing the movement of the finger in the drag operation determined in the operation determination process, such that: i) the magnification is set to a first magnification of a constant value smaller than from when the drag operation starts at a start point for operation until when the drag operation passes a first section, and ii) the magnification is set to a value larger than the first magnification after the drag operation passes the first section.

5. The robot operation apparatus according to claim 4, wherein:
the movement amount determination process determines the movement amount of the robot: i) by setting the magnification to a second magnification from when the drag operation moves to pass the first section until when the drag operation passes the second section, and ii) by setting the magnification to a third magnification of a constant value after the drag operation passes the second section; and
the second magnification is a value that continuously increases within a range from the first magnification to the third magnification in accordance with the movement amount of the drag operation.

6. A robot operation apparatus comprising:
a touch panel that receives a touch operation inputted from a user;
a touch operation detector that detects the touch operation in a planar direction of the touch panel inputted from the user;
a motion command generator that generates a motion command to operate an articulated robot having a plurality of driving axes based on a detection result of the touch operation detector; and a selection operation detector that is integrally or separately provided with the touch panel and detects a selection operation in the touch panel inputted from the user,
the motion command generator being configured to perform:
a selection process selecting, based on the detection result of the touch operation detector, one of combinations of the driving axes as an operation object from among preset combinations of the driving axes including at least one of: i) a first driving axis of the robot associated with a drag operation in a first direction on the touch panel; or ii) a second driving axis of the robot associated with a drag operation in a second direction intersecting with the first direction;
an operation determination process determining whether a direction of the drag operation is the first direction or the second direction, in response to the touch operation detected by the touch operation detector being the drag operation;
a first motion command generation process generating, in response to the direction of the drag operation being the first direction, a first motion command driving the first driving axis of the robot associated with the drag operation in the first direction among the combinations of driving axes selected in selection process; and
a second motion command generation process generating, in response to the direction of the drag operation being the second direction, a second motion command driving the second driving axis of the robot associated with the drag operation in the second direction among the combinations of driving axes selected in selection process; and
the robot including:
a base that is disposed on a set-up surface;
a shoulder that is disposed so as to be rotatable relative to the base by a first axis;
a lower arm that is disposed so as to be rotatable relative to the shoulder by a second axis;
a first upper arm that is disposed so as to be rotatable relative to the lower arm by a third axis;
a second upper arm that is disposed so as to be rotatable relative to the first upper arm by a fourth axis;
a wrist that is disposed so as to be rotatable relative to the second upper arm by a fifth axis; and
a flange that is disposed so as to be rotatable relative to the wrist by a sixth axis;
the combinations of driving axes including at least one of:
a first combination of the driving axes configured by: the first axis associated with the drag operation in the first direction, and the second axis associated with the drag operation in the second direction;
a second combination of the driving axes configured by: the fourth axis associated with the drag operation in the first direction, and the third axis associated with the drag operation in the second direction; or
a third combination of the driving axes configured by: the sixth axis associated with the drag operation in the first direction, and the fifth axis associated with the drag operation in the second direction.

7. A robot system comprising:
a six-axis vertical articulated robot having six driving axes;
a controller that controls motion of the robot; and
a robot operation apparatus including:

a touch panel that receives a touch operation inputted from a user;
a touch operation detector that detects the touch operation in a planar direction of the touch panel inputted from the user;
a motion command generator that generates a motion command to operate the robot based on a detection result of the touch operation detector; and
a selection operation detector that is integrally or separately provided with the touch panel and detects a selection operation in the touch panel inputted from the user,
the motion command generator being configured to perform:
  a selection process selecting, based on the detection result of the touch operation detector, one of combinations of the driving axes as an operation object from among preset combinations of the driving axes including at least one of: i) a first driving axis of the robot associated with a drag operation in a first direction on the touch panel; or ii) a second driving axis of the robot associated with a drag operation in a second direction intersecting with the first direction;
  an operation determination process determining whether a direction of the drag operation is the first direction or the second direction, in response to the touch operation detected by the touch operation detector being the drag operation;
  a first motion command generation process generating, in response to the direction of the drag operation being the first direction, a first motion command driving the first driving axis of the robot associated with the drag operation in the first direction among the combinations of driving axes selected in selection process; and
  a second motion command generation process generating, in response to the direction of the drag operation being the second direction, a second motion command driving the second driving axis of the robot associated with the drag operation in the second direction among the combinations of driving axes selected in selection process;
the six-axis vertical articulated robot including:
  a base that is disposed on a set-up surface;
  a shoulder that is disposed so as to be rotatable relative to the base by a first axis;
  a lower arm that is disposed so as to be rotatable relative to the shoulder by a second axis;
  a first upper arm that is disposed so as to be rotatable relative to the lower arm by a third axis;
  a second upper arm that is disposed so as to be rotatable relative to the first upper arm by a fourth axis;
  a wrist that is disposed so as to be rotatable relative to the second upper arm by a fifth axis; and
  a flange that is disposed so as to be rotatable relative to the wrist by a sixth axis; and
the combinations of driving axes including at least one of:
  a first combination of the driving axes configured by: the first axis associated with the drag operation in the first direction, and the second axis associated with the drag operation in the second direction;
  a second combination of the driving axes configured by: the fourth axis associated with the drag operation in the first direction, and the third axis associated with the drag operation in the second direction; or
  a third combination of the driving axes configured by: the sixth axis associated with the drag operation in the first direction, and the fifth axis associated with the drag operation in the second direction.

8. A non-transitory computer-readable storage medium storing a robot operation program performed by a computer embedded in a robot operation apparatus for operating a robot,
the robot operation apparatus including:
  a touch panel that receives a touch operation inputted from a user;
  a touch operation detector that detects the touch operation in a planar direction of the touch panel inputted from the user;
  a motion command generator that generates a motion command to operate an articulated robot having a plurality of driving axes based on a detection result of the touch operation detector; and
  a selection operation detector that is integrally or separately provided with the touch panel and detects a selection operation in the touch panel inputted from the user,
the robot including:
  a base that is disposed on a set-up surface;
  a shoulder that is disposed so as to be rotatable relative to the base by a first axis;
  a lower arm that is disposed so as to be rotatable relative to the shoulder by a second axis;
  a first upper arm that is disposed so as to be rotatable relative to the lower arm by a third axis;
  a second upper arm that is disposed so as to be rotatable relative to the first upper arm by a fourth axis;
  a wrist that is disposed so as to be rotatable relative to the second upper arm by a fifth axis; and
  a flange that is disposed so as to be rotatable relative to the wrist by a sixth axis,
the combinations of driving axes including at least one of:
  a first combination of the driving axes configured by: the first axis associated with the drag operation in the first direction, and the second axis associated with the drag operation in the second direction;
  a second combination of the driving axes configured by: the fourth axis associated with the drag operation in the first direction, and the third axis associated with the drag operation in the second direction; or
  a third combination of the driving axes configured by: the sixth axis associated with the drag operation in the first direction, and the fifth axis associated with the drag operation in the second direction,
the robot operation program enabling a computer embedded in the robot operation apparatus to execute:
  a selection process selecting, based on the detection result of the touch operation detector, one of combinations of the driving axes as an operation object from among preset combinations of the driving axes including at least one of: i) a first driving axis of the robot associated with a drag operation in a first direction on the touch panel; or ii) a second driving axis of the robot associated with a drag operation in a second direction intersecting with the first direction;
  an operation determination process determining whether a direction of the drag operation is the first direction or the second direction, in response to the touch operation detected by the touch operation detector being the drag operation;

a first motion command generation process generating, in response to the direction of the drag operation being the first direction, a first motion command driving the first driving axis of the robot associated with the drag operation in the first direction among the combinations of driving axes selected in selection process; and a second motion command generation process generating, in response to the direction of the drag operation being the second direction, a second motion command driving the second driving axis of the robot associated with the drag operation in the second direction among the combinations of driving axes selected in selection process.

* * * * *